United States Patent [19]
Frederiksen et al.

[11] Patent Number: 5,555,153
[45] Date of Patent: Sep. 10, 1996

[54] VOLTAGE AND/OR CURRENT PROTECTOR AND GROUNDING BAR ARRANGEMENT FOR AT&T STYLE 110 BLOCK

[75] Inventors: Bjarne Frederiksen, Lombard; Gregory R. Hayward, Glenview, both of Ill.

[73] Assignee: Illinois Tool Works Inc., Glenview, Ill.

[21] Appl. No.: 273,201

[22] Filed: Jul. 11, 1994

Related U.S. Application Data

[63] Continuation-in-part of Ser. No. 923,249, Jul. 31, 1992, Pat. No. 5,341,269.

[51] Int. Cl.$^6$ .............................. H02H 1/04; H02H 3/22
[52] U.S. Cl. .............................. 361/119; 361/91; 361/111
[58] Field of Search .............................. 361/56, 91, 111, 361/117–119, 728, 730, 823, 824, 833–835, 837

[56] References Cited

U.S. PATENT DOCUMENTS

| | | | |
|---|---|---|---|
| 4,846,735 | 7/1989 | Teichler et al. | 439/709 |
| 4,849,846 | 7/1989 | Hung et al. | 361/56 |
| 4,922,374 | 5/1990 | Mueller et al. | 361/119 |
| 4,968,264 | 11/1990 | Ruehl et al. | 439/622 |
| 5,341,269 | 8/1994 | Hayward et al. | 361/119 |
| 5,357,569 | 10/1994 | Pelegris | 361/119 |

*Primary Examiner*—Jeffrey A. Gaffin
*Assistant Examiner*—Ronald W. Leja
*Attorney, Agent, or Firm*—Schwartz & Weinrieb

[57] ABSTRACT

A voltage protector and grounding bar arrangement is provided for use with a telephone terminal block having at least two rows of terminals which are spaced apart from each other so as to define an elongated channel therebetween. A housing has incorporated therein a voltage suppressor, terminal contacts for mating with the terminals of the terminal block, and a ground contact for mating with a grounding bar disposed within the channel of the terminal block. Plug-in carrier devices are adapted to be mounted in a plug-in manner upon the housing, and the carrier devices may comprise fuse-type current limiting devices, positive-temperature-coefficient (PTC) current limiting devices, or bridging clips. The housing may accommodate a single plug-in carrier device, or dual plug-in carrier devices whereby protection is afforded to the circuit-to-be-protected in a multitude of directions.

30 Claims, 14 Drawing Sheets

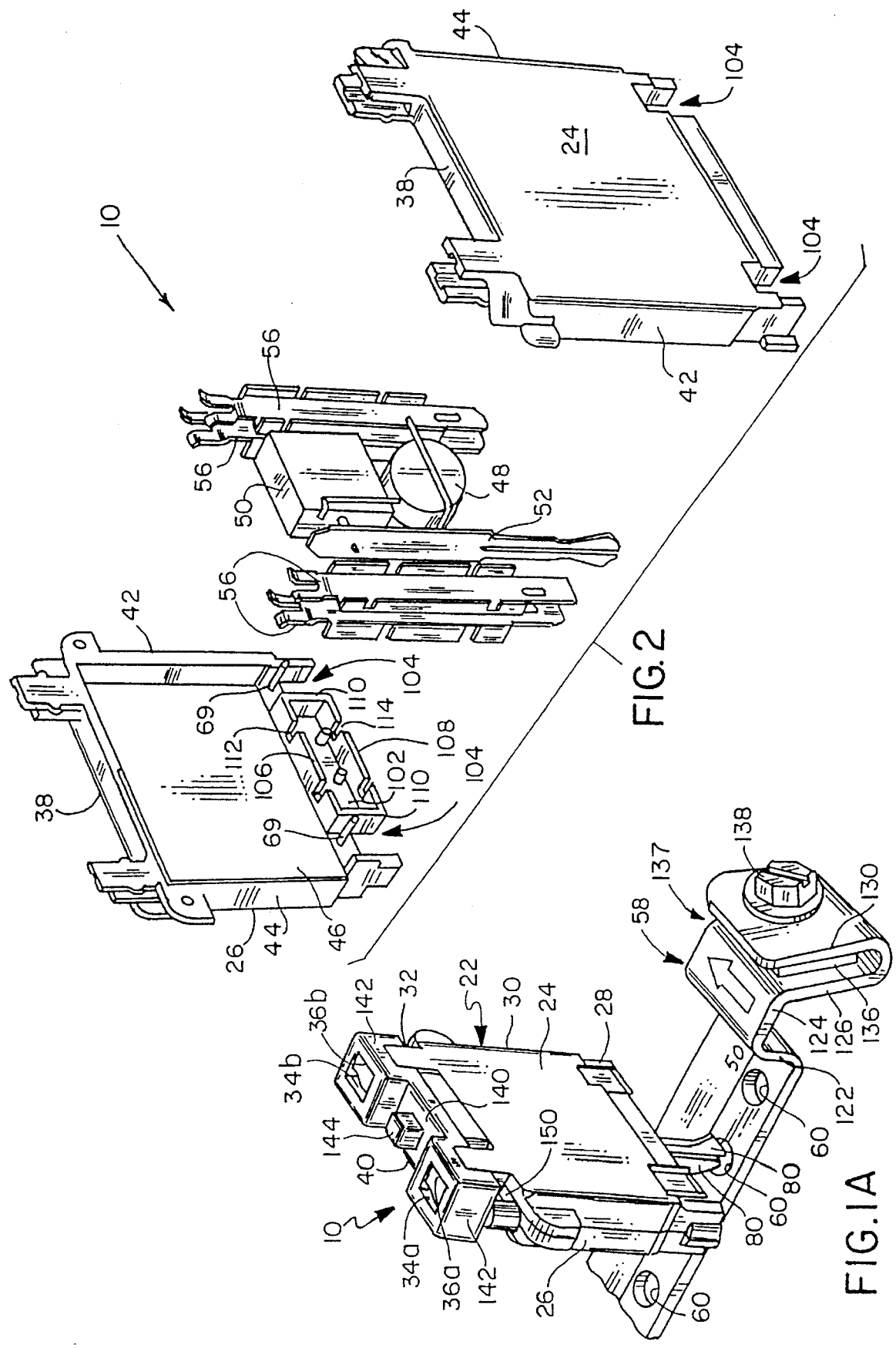

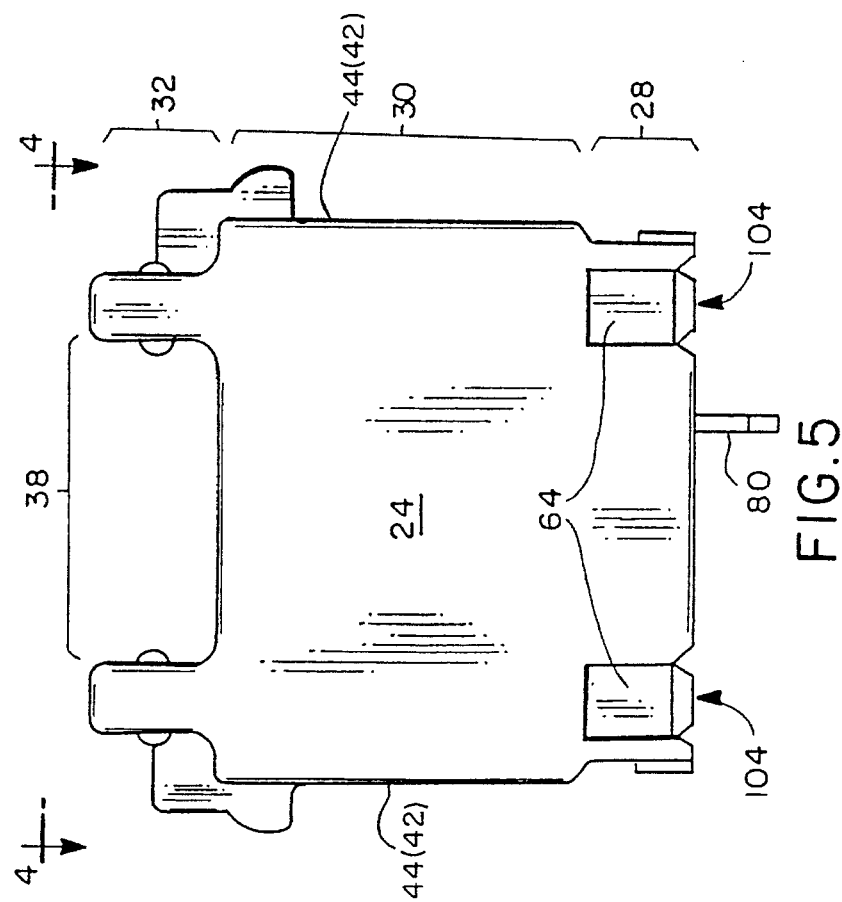
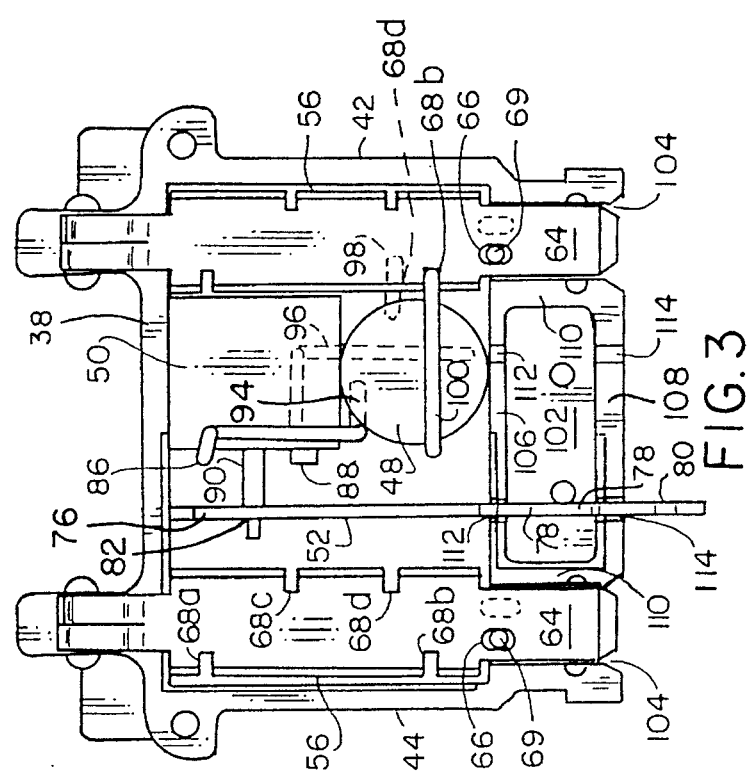
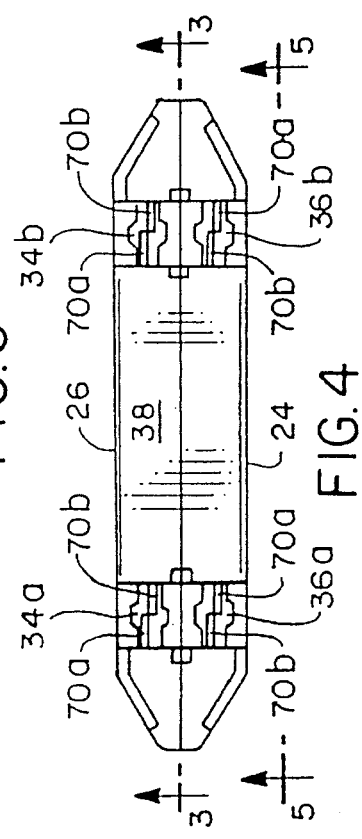

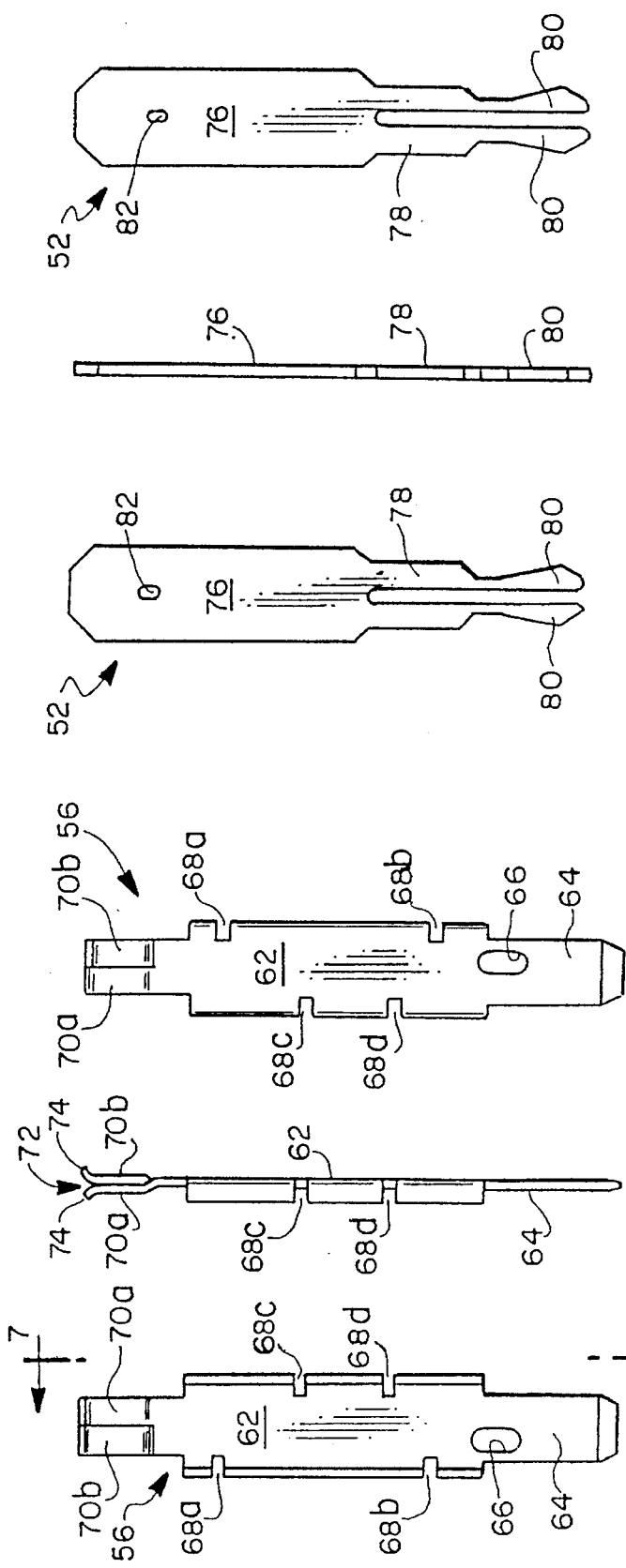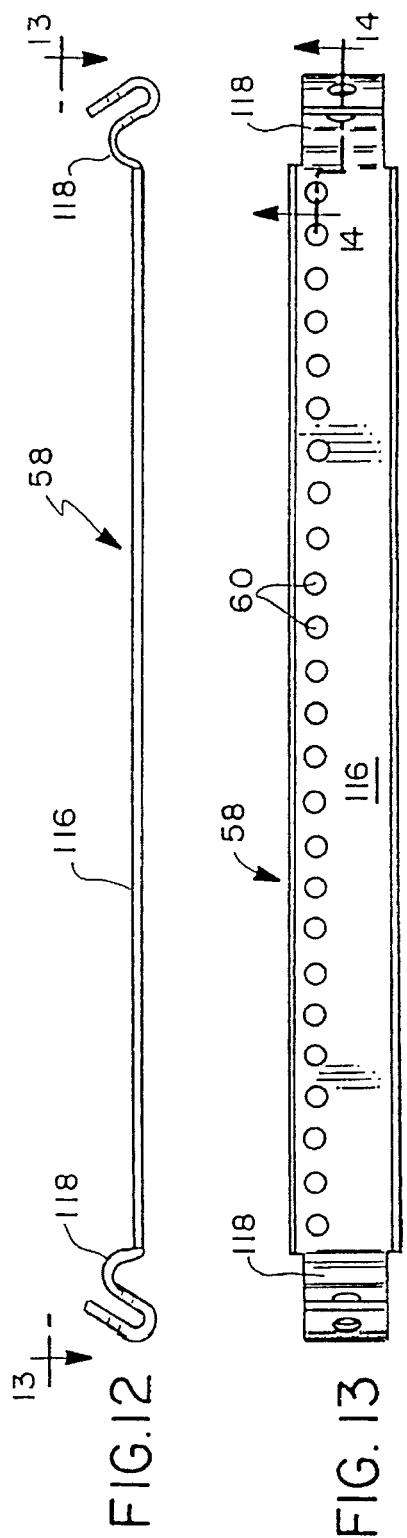

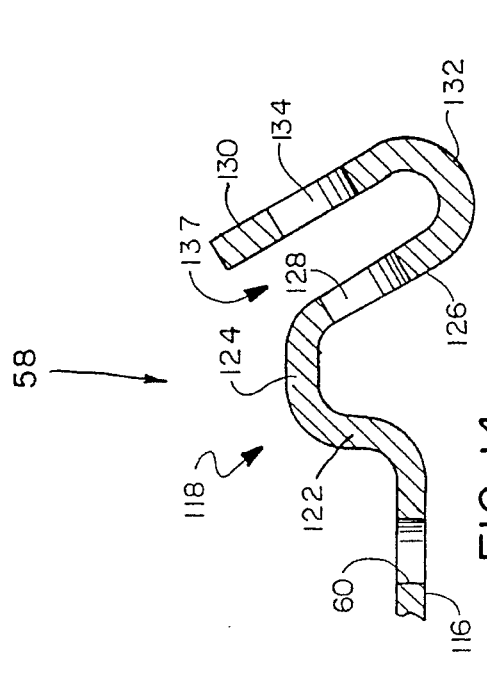
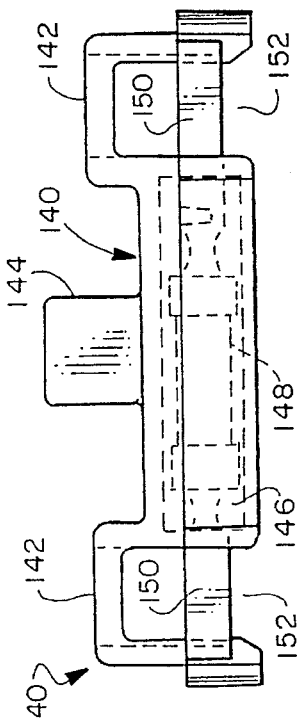
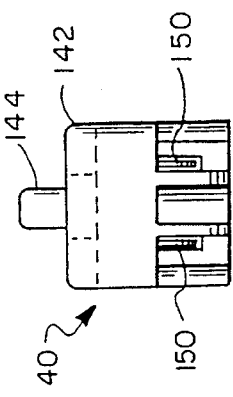
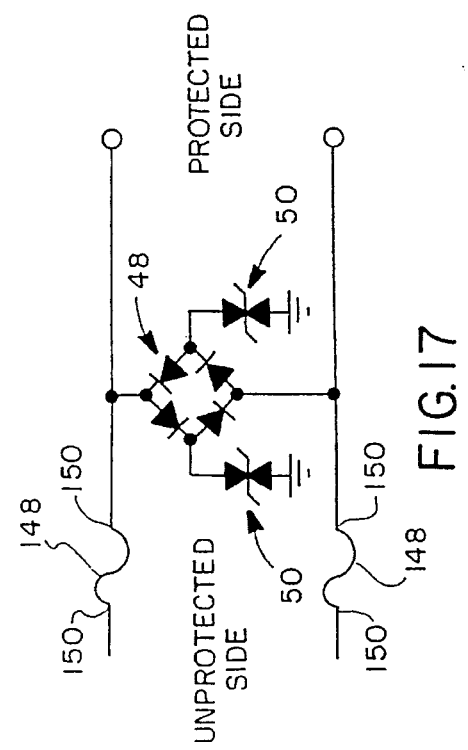

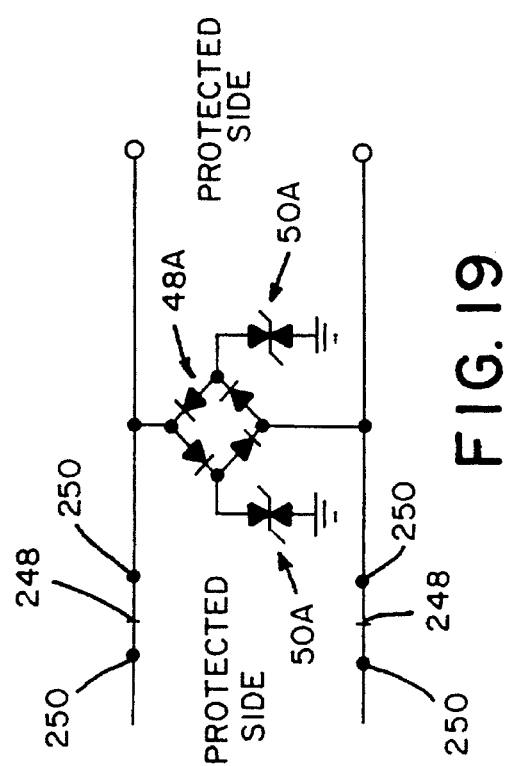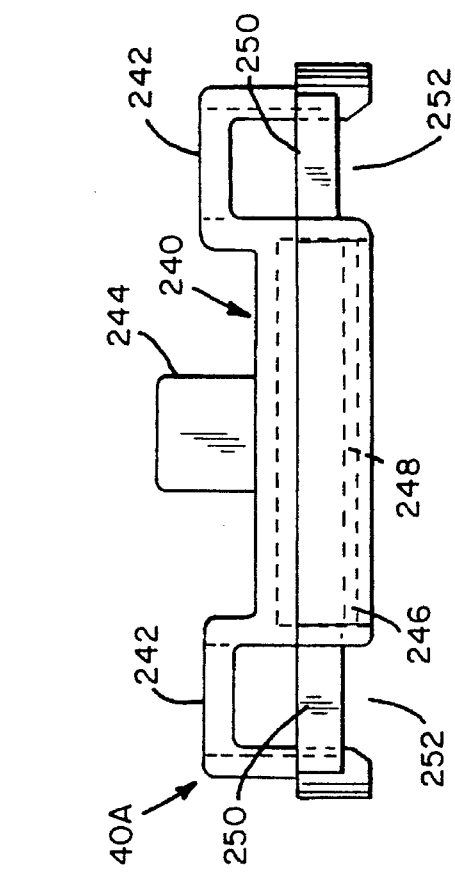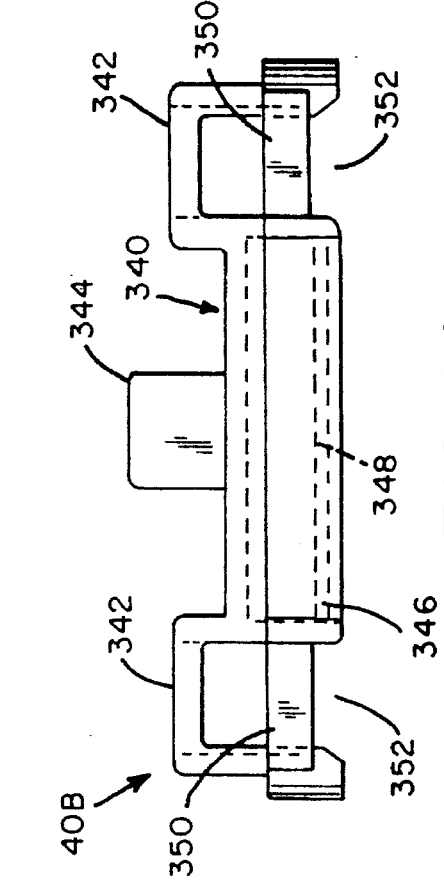

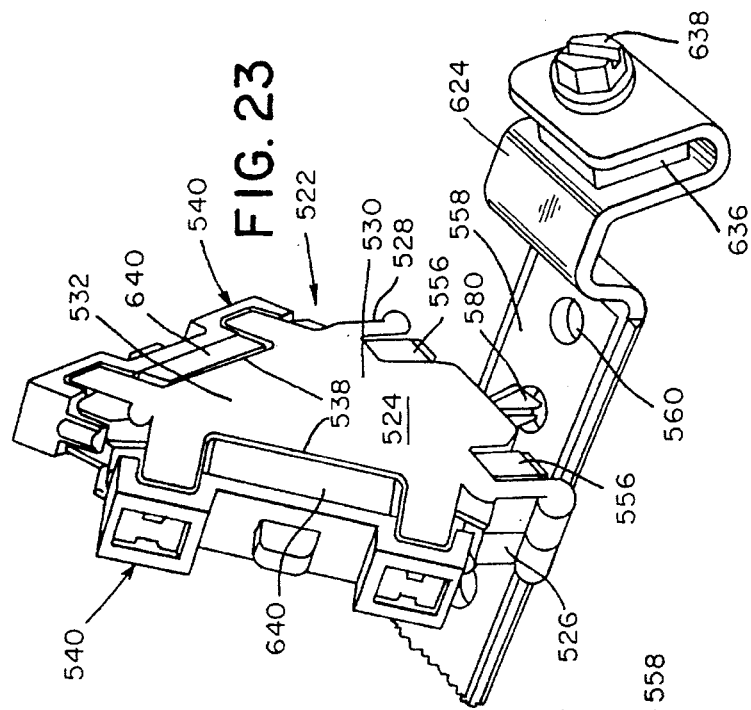
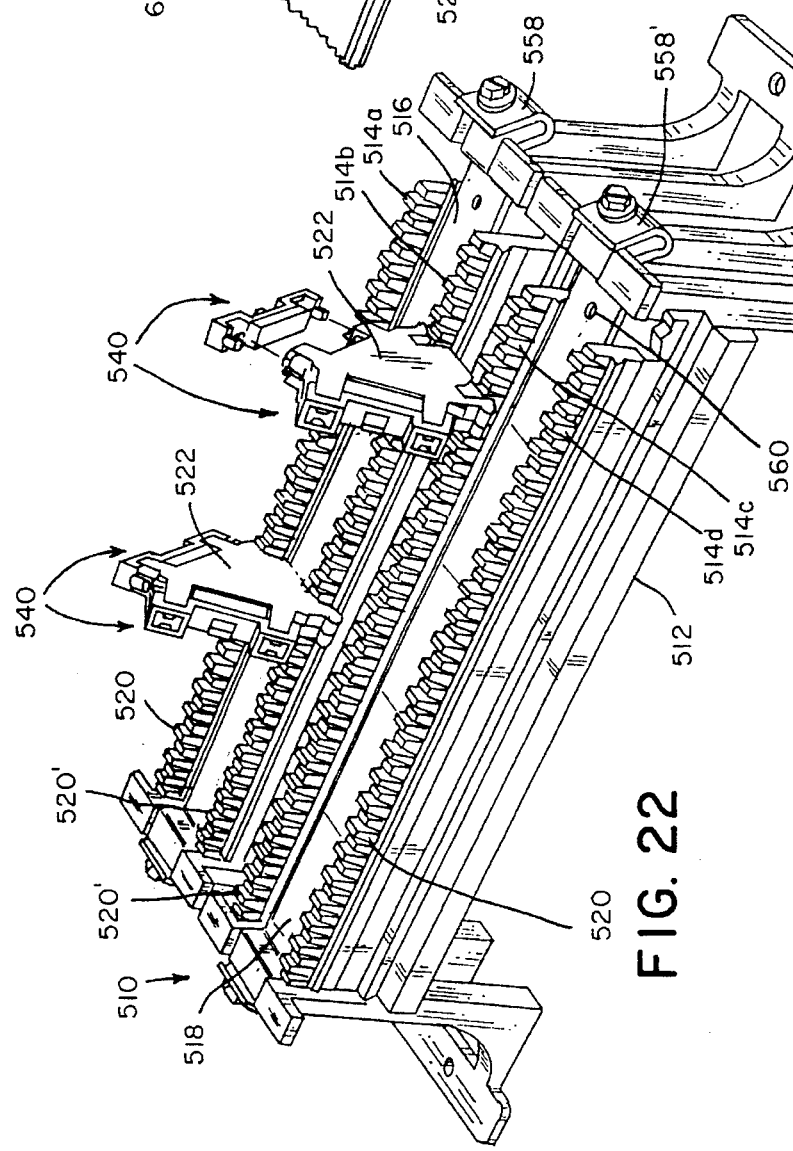

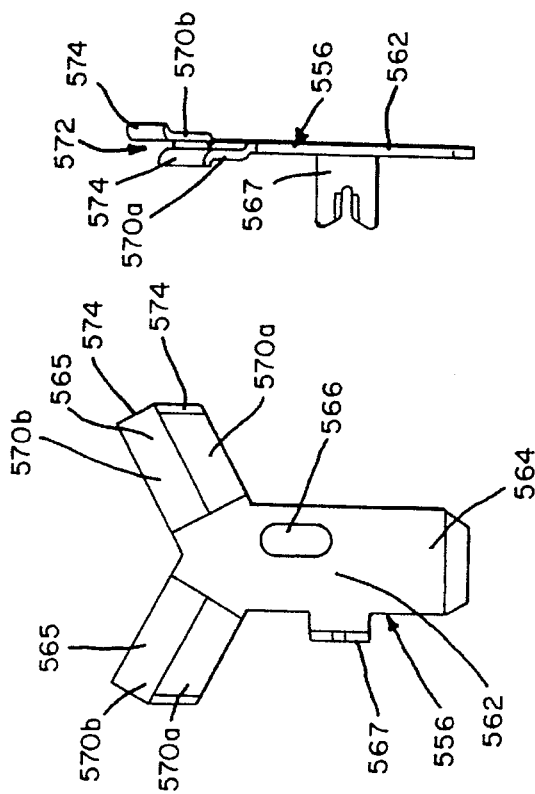
FIG. 29
FIG. 28
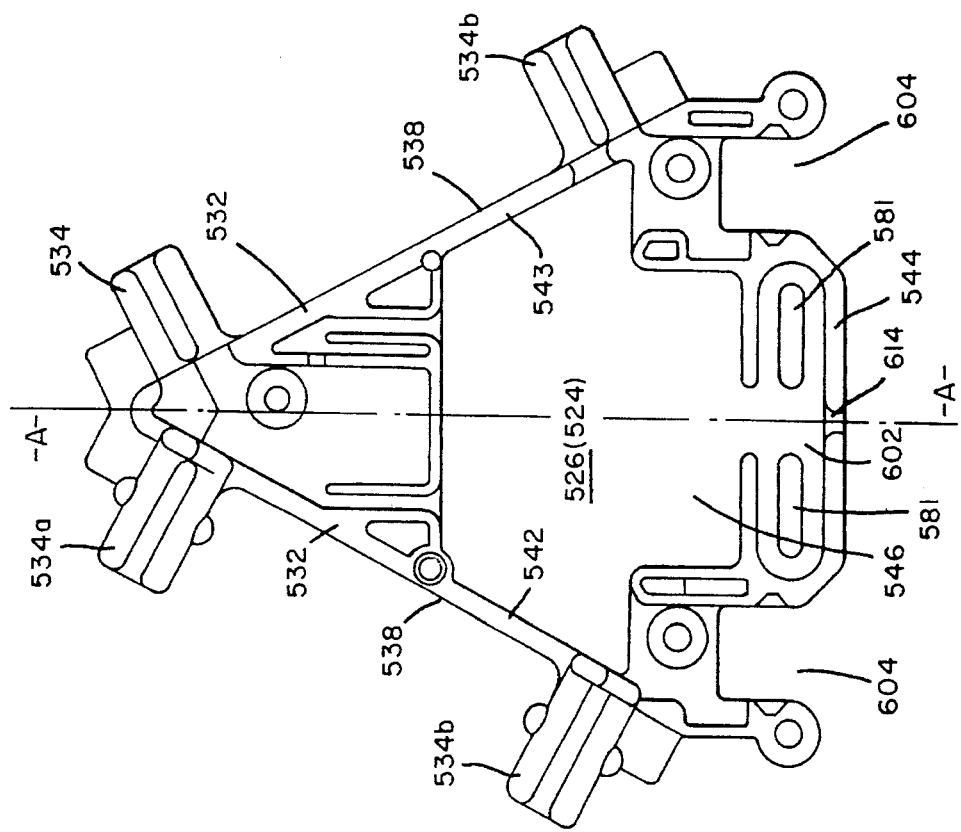
FIG. 24

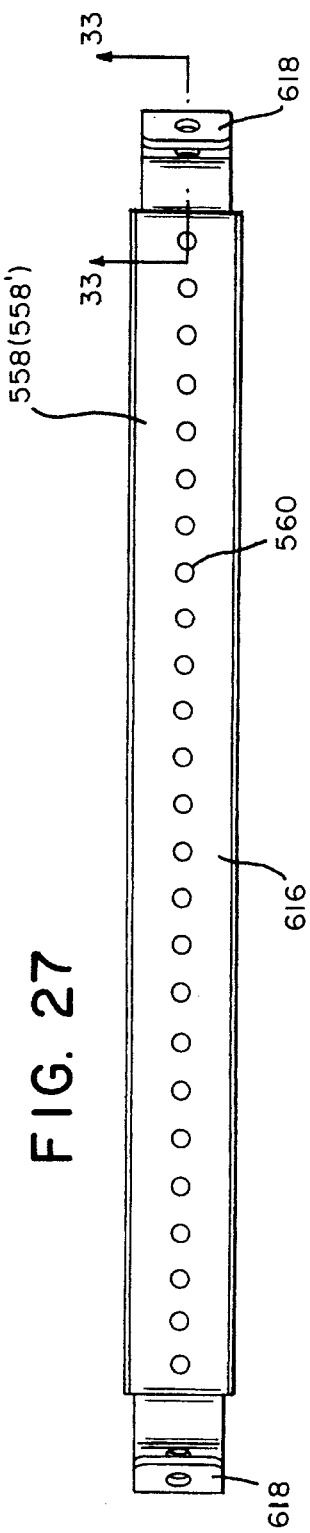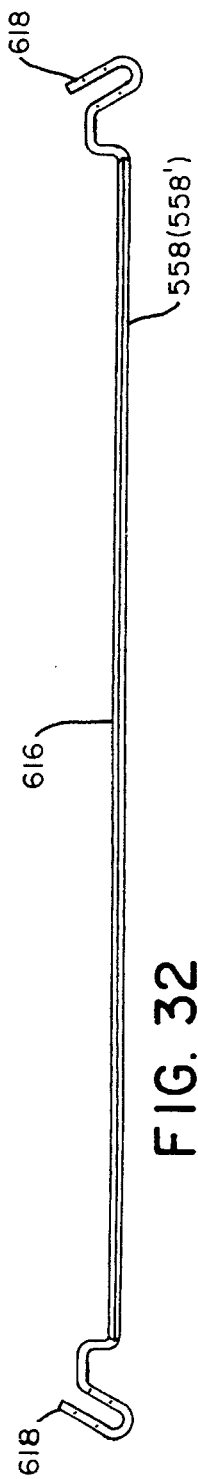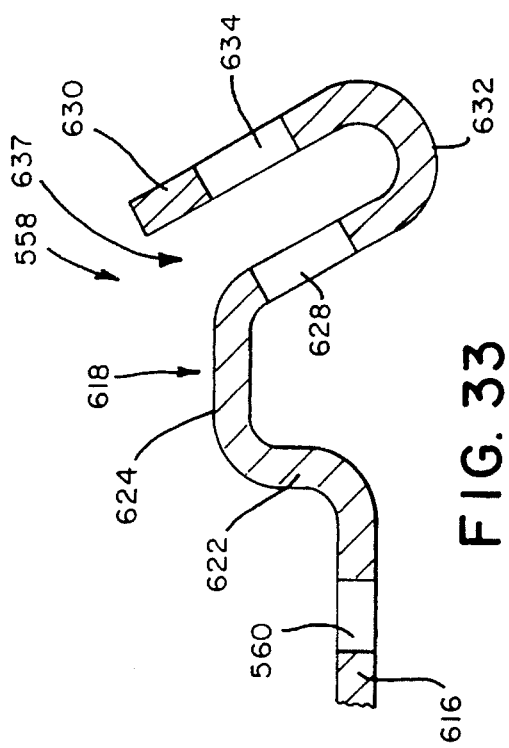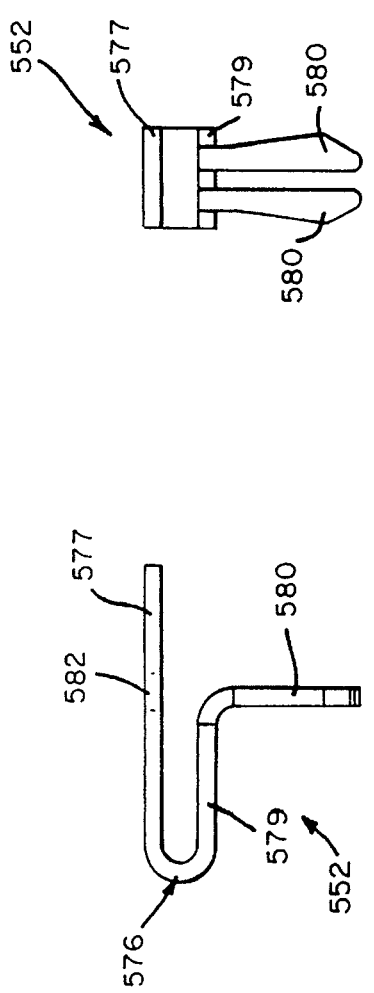

VOLTAGE AND/OR CURRENT PROTECTOR AND GROUNDING BAR ARRANGEMENT FOR AT&T STYLE 110 BLOCK

CROSS-REFERENCE TO RELATED PATENT APPLICATIONS

This patent application is a Continuation-In-Part (CIP) of United States patent application Ser. No. 07/923,249, filed Jul. 31, 1992 in the name of Gregory R. Hayward et al., and for a VOLTAGE PROTECTOR AND GROUNDING BAR ARRANGEMENT FOR TERMINAL BLOCK, now U.S. Pat. No. 5,341,269.

FIELD OF THE INVENTION

The present invention relates generally to transient voltage protector packages, and more particularly to a voltage and/or current protector and grounding bar arrangement which includes a two-piece interfitting housing for receiving an overvoltage protection device having a ground contact, a grounding bar adapted to be mounted upon a terminal block for connection to the ground contact, and optionallly, a surge-current protector or current limiting device, either of the single or double Sided type, for mounting upon the housing.

BACKGROUND OF THE INVENTION

Heretofore, there has been known in the prior art a plug-in fuse carrier which has been operable as a surge-current protector in connection with the cross-connection of two rows of terminals of a telephone terminal block, conventionally referred to as an AT&T Style 110 Block, which is commonly used within telephone and other electronic applications. Such a fuse carrier is illustrated and described within U.S. Pat. No. 4,968,264 which was issued to William E. Ruehl et al. and is assigned to the same assignee as that of the present patent application. The fuse carrier disclosed within this patent comprises an insulating housing 12, and a cover 14 which is mounted upon the housing. The cover 14 includes a first platform 16 disposed upon one end thereof, and a second platform 18 disposed upon the other end thereof. The cover 14 is disposed upon the housing 12 so as to enclose a cavity 20 which is therefore defined within the housing 12. Fuses 22 and 24, having a tubular configuration, are mounted within the cavity 20 in an off-set manner so as to accommodate their diametrical dimensions and to minimize the space requirements within the cavity 20. Each one of the fuses 22 and 24 includes contact blades 32, 36 extending through aligned slits defined within the housing end walls for resting against an upright 88 and for providing a contact area within a gap 86 defined within each end of the fuse carrier. The fuse carrier is readily insertable between the two rows of terminals of the terminal block so as to interconnect two circuits, operatively associated with the terminal block, by means of the fuses 22, 24.

Accordingly, it is seen that the aforenoted type of prior art fuse carrier only provided over-current or surge-current protection. However, it is also well-known that telephone circuits normally operate upon relatively low voltage levels but are sometimes exposed to transient voltages which are considerably greater than the normal operating voltages. Such transient voltages may be caused, for example, by means of a lightning strike, a short circuit connection with a high voltage line, and the like. Therefore, it is also desirable to provide high transient voltage or over-voltage protection for such telephone circuitry. While the prior art is additionally known to disclose plug-in structures which are able to be used in connection with telephone terminal blocks and which include various electrical components for protecting the telephone circuitry against high transient voltage or over-voltage conditions, there was a need in the art, to which the invention embodied and disclosed within the aforenoted parent, pending United States Patent application Ser. No. 07/923,249, now U.S. Pat. No. 5,341,269 was directed, for a device and structural arrangement which could readily and compactly provide both over-current and over-voltage protection for the terminal block circuitry.

Briefly, in accordance with the composite voltage protector and grounding bar arrangement for telephone terminal blocks as disclosed within the aforenoted parent, pending United States patent application Ser. No. 07/923,249, now U.S. Pat. No. 5,341,269, there was disclosed a two-piece interfitting housing having an over-voltage protection device disposed therein and operatively connected to a ground contact. A strip-like grounding bar was configured so as to be able to be disposed within a longitudinally extending channel defined between two rows of laterally spaced terminals provided upon the telephone terminal block, the grounding bar being provided with a longitudinally extending array of holes into which the ground contact of the two-piece housing was able to be disposed. A plurality of terminal/fuse contacts were also provided internally within the two-piece housing, and plug-in surge-current or over-current protection means, such as, for example, a fuse carrier, was operatively mounted upon the housing for connection to the terminal/fuse contacts. The terminal/fuse contacts also interconnected opposed terminals of the two rows of laterally spaced terminals of the telephone terminal block.

While the foregoing composite voltage protector and grounding bar arrangement has in fact provided the necessary voltage and current protection requirements, it has been alternatively realized or desired that in conjunction with particular or specific telephone terminal blocks, arrangements, or applications, such a composite voltage protector and grounding bar arrangement is not in fact required. For example, in connection with a particular or specific telephone terminal block, arrangement, or application, over-current protection may already be effectively provided or incorporated within the system or circuitry by means of a suitable over-current or surge-current device which is located externally of, or at a location remote from, the two-piece housing. Nevertheless, in order to simplify manufacture of the two-piece housings, and to further minimize manufacturing costs thereof, it is desired to provide similar or standardized housings regardless of whether or not the housings will accommodate an over-current or surge-current device. In such a situation, therefore, the same or similar housing may simply accommodate a bridging-clip device whereby this altered composite voltage protector and grounding bar arrangement only provides over-voltage or surge-voltage protection. Similarly, and yet still further, in conjunction with still other particular or specific telephone terminal blocks, arrangements, or applications, in lieu of providing over-current or surge-current protection in the form of fuse devices, it is sometimes desirable or required to provide such protection in the form of positive-temperature-coefficient (PTC) current-limiting devices which are automatically resettable. Again, it is desired to be able to provide or mount such devices upon the same or similar housing whereby the manufacture of such housings is able to be maintained uniform or standardized. Lastly, it is further desired in conjunction with other telephone terminal blocks, arrangements, and applications, to provide over-current or surge-current, or over-voltage or surge-voltage, protection with respect to both sides of the particular circuits being protected in order to protect the circuits from over-current or surge-current, or over-voltage or surge-voltage, conditions which may be generated in a multiplicity of directions, such as, for example, from the telephone central office, from the customer premises, or from the customer ground line. Consequently, in is likewise desired to be able to provide or mount such devices upon housings which are substantially or sufficiently similar to the aforenoted housing of the noted parent, pending United States patent application Ser. No. 07/923,249, now U.S. Pat. No. 5,341,269, whereby such newly configured, similar housings are nevertheless able to be used in conjunction with the same telephone terminal blocks, that is, for example, the AT&T Style 110 Block.

OBJECTS OF THE INVENTION

Accordingly, it is a general object of the present invention to provide a new and improved voltage and/or current protector and grounding bar arrangement for a telephone terminal block which is relatively simple and economical to manufacture or assemble.

Another object of the present invention is to provide a new and improved voltage and/or current protector and grounding bar arrangement for a telephone terminal block wherein the voltage/current protector and grounding bar arrangement for the telephone terminal block provide both over-current or surge-current, as well as over-voltage or surge-voltage, protection, and wherein further the over-current or surge-current protection is provided by means of plug-in current protection devices in the form of fuses or other current limiting devices.

Still another object of the present invention is to provide a new and improved voltage protector and grounding bar arrangement for a telephone terminal block wherein the voltage protector and grounding bar arrangement for the telephone terminal block provide only over-voltage or surge-voltage protection, and wherein further, the over-voltage or surge-voltage protection is provided by means of suitable voltage suppressor means disposed within a two-piece interfitting housing, a plug-in bridging clip device being mounted upon the housing at the same location as, and in lieu of, the aforenoted plug-in current protection device.

Yet another object of the present invention is to provide a new and improved voltage protector and grounding bar arrangement for a telephone terminal block wherein the voltage protector and grounding bar arrangement for the telephone terminal block provide both over-current or surge-current, as well as over-voltage or surge-voltage, protection, and wherein further the over-current or surge-current protection is provided by means of plug-in current limiting devices, in the form of, for example, positive-temperature-coefficient (PTC) components, which are adapted to be mounted upon the two-piece interfitting housing at the same location as, and in lieu of, the aforenoted plug-in current protection or bridging clip devices.

Still yet another object of the present invention is to provide a new and improved voltage protector and grounding bar arrangement for a telephone terminal block wherein, regardless of the particular type of protection sought and embodied within a particular voltage protector and grounding bar arrangement for a particular telephone terminal block, that is, whether over-voltage and current protection, or only over-voltage, or over-voltage and current-limiting, protection is provided, the two-piece interfitting housings, and the current protection, bridging clip, and positive-temperature coefficient devices plugged thereinto, are uniform, standardized, and interchangeable.

Yet still another object of the present invention is to provide a new and improved voltage protector and grounding bar arrangement for a telephone terminal block wherein, in lieu of a single plug-in current protection device or fuse, bridging clip, or current-limiting device or positive-temperature-coefficient (PTC) component being mounted upon the aforenoted two-piece interfitting housing, a pair of plug-in current protection devices or fuses, bridging clips, or positive-temperature-coefficient (PTC) components are mounted upon a similar, but somewhat differently configured, two-piece interfitting housing in order to protect the circuits from over-current or surge-current, or over-voltage or surge-voltage, conditions which may be generated in a multiplicity of directions, the latter, similar, but somewhat differently configured housings nevertheless being capable of being used in conjunction with the same, standardized, or conventional telephone terminal blocks, that is, for example, the AT&T Style 110 Block.

SUMMARY OF THE INVENTION

The foregoing and other objectives of the present invention are achieved in accordance with the present invention through the provision of a new and improved voltage protector and grounding bar arrangement for a telephone terminal block wherein, in accordance with a first embodiment of the invention, there is provided a two-piece interfitting housing having an over-voltage or surge-voltage device enclosed therein, the over-voltage device having a ground contact connected thereto; a grounding bar adapted to be mounted upon the terminal block for connection with the ground contact of the over-voltage or surge-voltage device; and a surge-current or over-current protection device, in the form of a plug-in fuse carrier, which is thereby adapted to be mounted upon the two-piece interfitting housing.

In accordance with a second embodiment of the present invention, there is provided a new and improved voltage protector and grounding bar arrangement for a telephone terminal block which includes a two-piece interfitting housing having an over-voltage or surge-voltage device disposed therein, the over-voltage or surge voltage device having a ground contact connected thereto; a grounding bar adapted to be mounted upon the terminal block for connection with the ground contact of the over-voltage or surge-voltage device; and a plug-in bridging clip device which is adapted to be mounted upon the two-piece interfitting housing;at the same location as, and in lieu of, the aforenoted plug-in surge-current or over-current fuse carrier protection device.

In accordance with a third embodiment of the present invention, there is provided a new and improved voltage protector and grounding bar arrangement for a telephone terminal block which includes a two-piece interfitting housing having an over-voltage or surge-voltage device disposed therein, the over-voltage or surge-voltage device having a ground contact connected thereto; a grounding bar adapted to be mounted upon the terminal block for connection with the ground contact of the over-voltage or surge-voltage device; and a current limiting device, in the form of, for example, a plug-in positive-temperature-coefficient (PTC) component, which is adapted to be mounted upon the two-piece interfitting housing at the same location as, and in lieu of, either the aforenoted plug-in surge-current or over-current fuse carrier protection device, or the aforenoted plug-in bridging clip device.

In accordance with fourth, fifth, and sixth embodiments of the present invention, respectively, there are provided new and improved voltage protectors and ground bar arrangements for telephone terminal blocks which include a two-piece interfitting housing having an over-voltage or surge-voltage device disposed therein, the over-voltage or surge-voltage device having a ground contact connected thereto; a grounding bar adapted to be mounted upon the terminal block for connection to the ground contact of the over-voltage or surge-voltage device; and a pair of plug-in devices, which can either or alternatively comprise a pair of over-current or surge-current fuse carriers, a pair of bridging clips, or a pair of current limiting, positive-temperature-coefficient (PTC) components, which are adapted to be mounted upon the two-piece interfitting housing. The two-piece interfitting housings of the fourth, fifth, and sixth embodiments are similar to, but somewhat different from, the two-piece interfitting housings of the first, second, and third embodiments of the invention in order to accommodate the pair of plug-in devices, the first, second, and third embodiments only accommodating single or sole plug-in devices, however, it is further noted that the two-piece interfitting housings of the fourth, fifth, and sixth embodiments are sufficiently similar to the two-piece interfitting housings of the first, second, and third embodiments so as to nevertheless be capable of being used in conjunction with the same, standardized, or conventional telephone terminal block, that is, for example, the AT&T Style 110 Block.

BRIEF DESCRIPTION OF THE DRAWINGS

Various other objects, features, and attendant advantages of the present invention will be more fully appreciated from the following detailed description, when considered in connection with the accompanying drawings, in which similar reference characters designate like or corresponding parts throughout the several views, and wherein:

FIG. 1A is an enlarged, perspective view of the two-piece housing and grounding bar of the voltage protector and grounding bar arrangement shown in FIG. 1;

FIG. 2 is an exploded perspective view of the two-piece housing of FIG. 1A with the fuse carrier and grounding bar having been removed;

FIG. 3 is a front elevational view of the back half of the two-piece housing of FIG. 2, with certain components of the housing assembled therein;

FIG. 4 is a top plan view, taken along the lines 4—4 of FIG. 5, showing the two-piece interfitting housing of FIG. 2 when assembled together;

FIG. 5 is a front elevational view, taken along the lines 5—5 of FIG. 4, showing the two-piece interfitting housing of FIG. 2 when assembled together;

FIG. 6 is a front elevational view of one of the terminal/fuse contacts enclosed within the two-piece interfitting housing of FIG. 2;

FIG. 7 is a side elevational view of the terminal/fuse contact shown in FIG. 6 as taken along the lines 7—7 of FIG. 6;

FIG. 8 is a rear elevational view of the terminal/fuse contact shown in FIG. 6;

FIG. 9 is a front elevational view of the ground contact enclosed within the two-piece interfitting housing of FIG. 2;

FIG. 10 is a side elevational view of the ground contact shown in FIG. 9;

FIG. 11 is a rear elevational view of the ground contact shown in FIG. 9;

FIG. 12 is a side elevational view of the grounding bar component of the voltage protector and grounding bar arrangement shown in FIG. 1;

FIG. 13 is a top plan view of the grounding bar shown in FIG. 12 as viewed along the lines 13—13 of FIG. 12;

FIG. 14 is a cross-sectional view of a portion of the grounding bar shown in FIG. 13 taken along lines 14—14 of FIG. 13;

FIG. 15 is a side elevational view of the fuse carrier component of the voltage protector and grounding bar arrangement shown in FIG. 1;

FIG. 16 is an end elevational view of the fuse carrier shown in FIG. 15;

FIG. 17 is a schematic circuit diagram of the protected circuit having the plug-in fuse carrier of FIG. 1A incorporated therein;

FIG. 18 is a side elevational view similar to that of FIG. 15 showing however a bridging clip carrier which may be used in the voltage protector and grounding bar arrangement of FIG. 1;

FIG. 19 is a schematic circuit diagram similar to that of FIG. 17 showing however the protected circuit when the bridging clip carrier of FIG. 18 is used in the arrangement of FIG. 1;

FIG. 20 is a side elevational view of a positive-temperature-coefficient (PTC) plug-in carrier which may be used in the arrangement of FIG. 1;

FIG. 21 is a schematic circuit diagram showing the protected circuit when the PTC carrier of FIG. 20 is employed within the arrangement of FIG. 1;

FIG. 22 is a perspective view similar to that of FIG. 1 showing however an arrangement utilizing housings employing dual plug-in carriers for connection to the terminal block;

FIG. 23 is a view similar to that of FIG. 1A showing however the dual plug-in carrier housing and grounding bar of FIG. 22 when plug-in fuse carriers are employed;

FIG. 24 is a side elevational view of one of the housing halves of the dual plug-in carrier housing of FIG. 23;

FIG. 27 is a top plan view showing the grounding bar utilized in connection with the arrangement of FIG. 22;

FIG. 28 is a front elevational view of one terminal contact employed within the dual plug-in carrier housing of FIG. 23;

FIG. 29 is a side elevational view of the terminal contact of FIG. 28;

FIG. 30 is a front elevational view of the ground contact employed within the dual plug-in carrier housing of FIG. 23;

FIG. 31 is a side elevational view of the ground contact of FIG. 30;

FIG. 32 is a side elevational view of the grounding bar of FIG. 27;

FIG. 33 is an enlarged cross-sectional view, taken along the line 33—33, of one terminal end portion of the grounding bar of FIG. 32;

DETAILED DESCRIPTION OF THE ILLUSTRATED EMBODIMENTS

Figure 1:
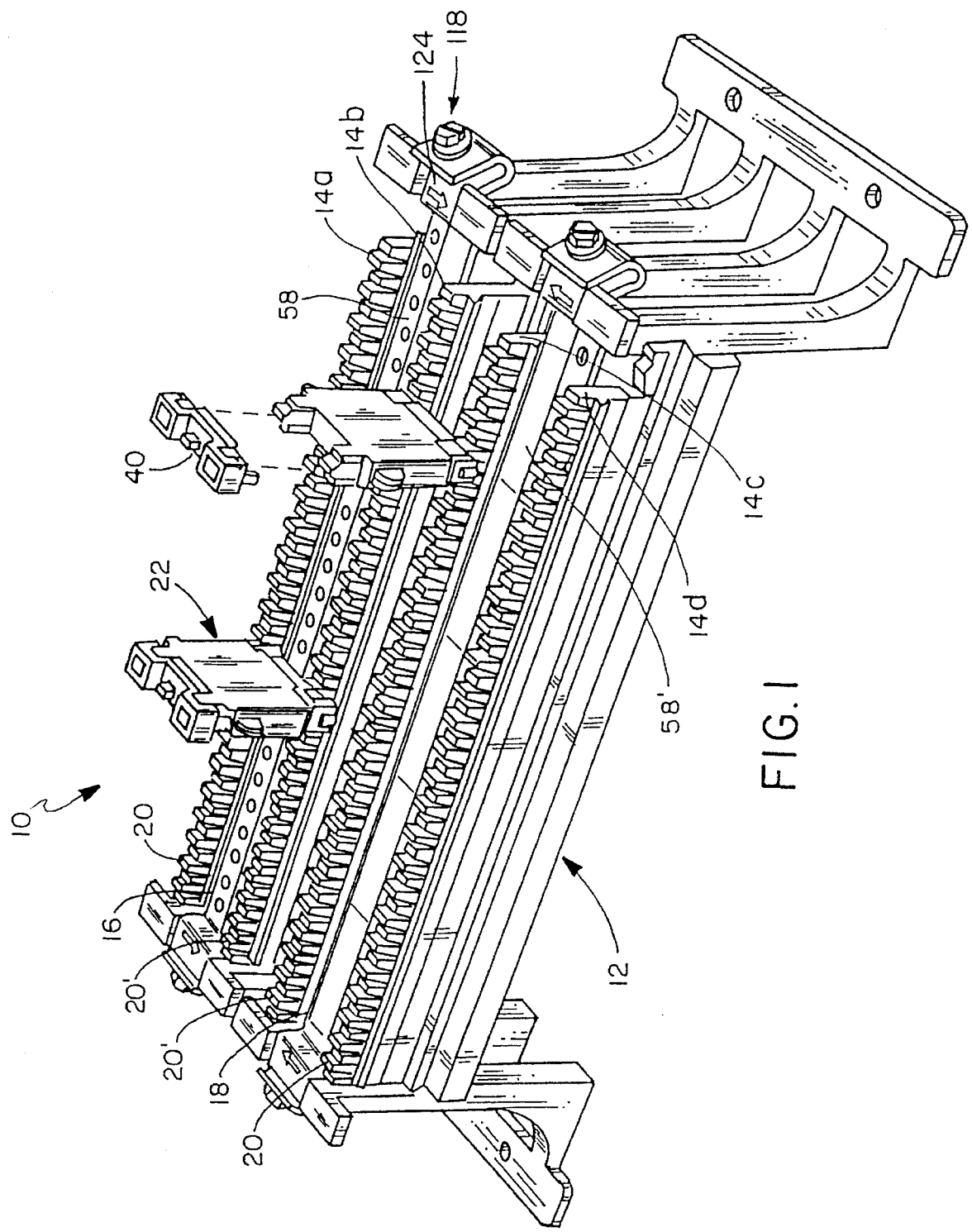
FIG. 1 is a perspective view of a first embodiment of a voltage protector and grounding bar arrangement constructed in accordance with the principles of the present invention.

Referring now to the drawings, and more particularly to FIGS. 1–5 thereof, there is shown a first embodiment of a voltage protector and grounding bar arrangement constructed in accordance with the principles of the present invention and generally indicated by the reference character 10, such an arrangement being intended for use in connection with telephone terminal blocks, such as, for example, a block conventionally referred to as an AT&T Style 110 Block, which are commonly used in connection with telephone circuitry and other electronic applications or systems. As can be particularly seen from FIG. 1, the terminal block 12 comprises a plurality of rows of terminals 14a, 14b, 14c, and 14d. Terminal rows 14a and 14b are laterally spaced with respect to each other so as to form an elongated or longitudinally extending channel 16 therebetween, and similarly, terminal rows 14c and 14d are laterally spaced with respect to each other so as to form an elongated or longitudinally extending channel 18 therebetween.

Each one of the rows of terminals 14a–14d is provided with a plurality of longitudinally aligned terminals 20 or 20', and the terminals 20 disposed within the rows 14a and 14d are laterally aligned with corresponding terminals 20' disposed within terminal rows 14b and 14c, respectively. Therefore, each set of corresponding, laterally opposed or aligned terminals 20 and 20' define a terminal pair, and it will be seen hereinbelow that the voltage protector and grounding bar arrangement 10 of the present invention suitably interconnects pairs of opposed terminals 20—20' disposed within the terminal rows 14a and 14b, or 14c and 14d.

The voltage protector and grounding bar arrangement 10 includes a plastic housing 22 which is fabricated from a suitable plastic material, such as, for example, a fire-retardant polymer, and which is comprised of two co-mating front and back halves 24 and 26. The two housing halves 24 and 26 comprise identical parts which are assembled together and subsequently sonically welded to each other. The housing 22 may be considered as including or comprising a lower terminal portion or section 28, a middle body portion or section 30, and an upper plug-in carrier portion or section 32. More particularly, the lower terminal portion or section 28 is adapted to have the terminal components thereof plugged into the AT&T Style 110 Block such that the terminal components of the housing 22 are engaged with or are connected to the terminals 20 and 20' of the terminal block 12. The upper plug-in carrier portion or section 32 includes a first pair of laterally spaced recessed portions or sections 34a and 34b respectively defined within housing half 26, and a second pair of laterally spaced recessed portions or sections 36a and 36b respectively defined within housing half 24. The recessed portions or sections 34a and 36a, as well as recessed portions or sections 34b and 36b, are disposed in opposed or aligned pairs, and the sets of opposed or aligned pairs of recessed portions or sections 34a and 36a, and 34b and 36b, are laterally separated from each other by means of a central, recessed bridging portion or section 38. In accordance with the principles of a first embodiment of the present invention, the first pair of laterally spaced recessed portions or sections 34a and 34b are provided for receiving oppositely disposed or extending contact blades 150 (see FIG. 15) of a first fuse disposed within a plug-in fuse carrier 40, while the second pair of laterally spaced recessed portions or sections 36a and 36b are similarly provided for receiving oppositely disposed or extending contact blades of a second fuse also disposed within the plug-in fuse carrier 40, a more detailed description of which will follow hereinafter, the fuse 148 and both sets of fuse contact blades 150 also being shown in FIGS. 15 and 16.

The front and back halves 24 and 26 of the housing 22 are provided with confronting and interfitting sidewall members 42 and 44, respectively, and are also provided with, in effect, relatively recessed rear wall members 46. In this manner, the wall members 42, 44, and 46 effectively define socket portions for receiving and enclosing a suitable rectifying device, such as, for example, a diode bridge rectifier 48, and a pair of suitable voltage suppressors, such as, for example, a sidactor or silicon avalanche suppressor 50. It is to be noted that the particular components to be incorporated within the housing 22 are not limited to those specifically noted, and that any number of different single or combined components may in fact be incorporated within the housing 22 in order to effectively create other products which may use the same housing 22. Continuing further, a ground contact 52 is also provided or disposed within the housing 22, for reasons that will become more apparent hereinafter, and it is seen that the ground contact 52 is interconnected with the voltage suppressor 50, and that a lower end portion of the ground contact 52 extends through slots 114 defined within a chamber 102 formed within a lower portion of the housing 22. Adjacent to each sidewall 42 and 44 of each housing half 24 and 26, there are disposed or provided within the housing 22, in accordance with the principles of this first embodiment of the present invention, four terminal/fuse contacts 56. In addition, a strip-like grounding bar 58 is adapted to be disposed within the elongated or longitudinally extending channel 16 defined between the terminal rows 14a and 14b of the terminal block 12, and similarly, another strip-like grounding bar 58' is adapted to be disposed within the elongated or longitudinally extending channel 18 defined between the terminal rows 14c and 14d of the terminal block 12. As best seen in FIG. 13, each one of the grounding bars 58 and 58' is provided with a plurality of serially aligned openings 60 for respectively receiving therein the prong-like distal or lower end portions 80 (see FIGS. 9–11) of the corresponding ground contacts 52.

The terminal/fuse contacts 56 shown in FIGS. 2 and 3 are all identical with respect to each other, and one of these contacts 56 is shown in complete detail in FIGS. 6–8. In particular, each one of the contacts 56 is preferably formed from a suitable phosphor-bronze strip metal and is tin-plated for solderability and corrosion resistance. Still further, each one of the terminal/fuse contacts 56 comprises an integral sheet metal stamping and includes a flat body portion 62 having a narrower leg portion 64 extending integrally and downwardly therefrom, the leg portion 64 having an oval-shaped mounting aperture 66 formed therein. The body portion 62 is also formed with an upper, horizontally-extending slit 68a, and a lower, horizontally-extending slit 68b disposed along the left side thereof for receiving therein terminal leads of electrical components, and similarly, the body portion 62 is also formed with an upper, horizontally-extending slit 68c, and a lower, horizontally-extending slit 68d, disposed along the right side thereof for likewise receiving therein terminal leads of electrical components. At the opposite or upper end portion of each contact 56, the body portion 62 is integrally provided with two off-set strip portions 70a and 70b which are, in effect, disposed upon opposite sides of the plane defining the body portion 62 so as to define therebetween a fuse-blade opening or cavity 72. Each one of the off-set strip portions 70a and 70b is also seen to comprise an outwardly deflected or flared distal tip portion 74 whereby such tip portions 74 together serve as a lead-in or guide for the fuse blade contacts 150 (see FIGS. 15 and 16) when the plug-in fuse carrier 40 is mounted upon the housing 22 as seen in FIGS. 1 and 1A.

The ground contact 52 is fabricated from a suitable non-ferrous sheet metal, and in a manner similar to that of fabricating the terminal/fuse contacts 56, the ground contact 52 is stamped from a suitable phosphor-bronze strip metal and is subsequently tin-plated for solderability and corrosion resistance. The ground contact 52 is shown in FIGS. 2 and 3 as being part of the housing assembly, and is also shown in complete detail in FIGS. 9–11. As can be appreciated from the latter drawing figures, the ground contact 52 is seen to comprise a substantially rectangular-shaped head portion 76, a similarly configured neck portion 78 extending downwardly from the lower end of head portion 76, and a pair of spaced-apart prong portions 80 extending downwardly from the lower end of neck portion 78. The head portion 76 includes an aperture 82 which is formed within an upper section of head portion 76 for receiving a terminal lead of an electrical component, and the ground contact 52 is seen to be disposed vertically within the housing 22 and is also interposed between the pairs of terminal/fuse contacts 56 as best appreciated from FIGS. 2 and 3.

As can best be appreciated from FIG. 3, the transient voltage suppressor 50, such as, for example, a sidactor or silicon avalanche suppressor, has terminal pin leads 86, 88, and 90. The rectifying device 48, such as, for example, a diode bridge rectifier, has its terminal leads 94 and 96 soldered to the respective terminal pin leads 86 and 88 of the voltage suppressor 50, while additional terminal leads 98 and 100 of the rectifier 48 are similarly soldered within respective slits 68d and 68b of one set of terminal/fuse contacts 56. Lastly, the terminal pin lead 90 of the voltage suppressor 50 extends through the aperture 82 of the head portion 76 of the ground contact 52 and is accordingly soldered thereto.

With reference still being made to FIGS. 2 and 3, it is seen that the lower terminal portion or section 28 of the housing 22 includes the chamber 102 which is interposed between laterally spaced, vertically extending, open cavities 104, and the narrower leg portions 64 of the four terminal/fuse contacts 56 are disposed within the two cavities 104. It will be further appreciated from FIGS. 2 and 3 that terminal/fuse contact standoffs 69, formed upon the housing halves 24 and 26, extend through apertures 66 defined within the narrower lower leg portions 64 of the contacts 56 so as to properly maintain the opposed contacts 56 of each pair of contacts 56 separated from each other. The chamber 102 is defined by means of an upper wall 106, a lower wall 108, and a pair of laterally separated sidewalls 110. The upper wall 106 has a pair of laterally spaced slots 112 defined therein, and the lower wall 108 similarly has a pair of laterally spaced slots 114 defined therein such that the slots 112 defined within upper wall 106 and the slots 114 defined within the lower wall 108 are vertically aligned, respectively, with respect to each other. The neck portion 78 of the ground contact 52 is disposed within chamber 102 such that the upper and lower ends thereof extend respectively through the slots 112 and 114. In addition, the head portion 76 of the ground contact 52 is captured between the interior walls of the bridging portions 38 of the housing halves 24 and 26, and the upper wall 106 of the chamber 102, such that the ground contact 52 is restrained within the housing 22 against both vertical and lateral movement. It will be additionally noted that the two prongs 80 of the ground contact 52 extend vertically downwardly through the slot 114 defined within the lower wall 108 of the chamber 102 so as to respectively engage one of the offset holes or apertures 60 defined within the grounding bar 58 in, in effect, a polarized manner.

The grounding bar 58 is fabricated from a suitable non-ferrous metal strip, such as, for example, copper, and is formed so as to have the configuration or structure partially shown in FIGS. 1 and 1A, and fully shown in detail in FIGS. 12–14. More particularly, the grounding bar 58 comprises a central, elongated flat horizontal member or portion 116, and a pair of end terminal portions 118 integrally connected to opposite ends of the horizontal portion or member 116. The horizontal portion or member 116 is provided with the plurality of serially aligned offset holes or apertures 60 for receiving therein the two prongs 80 of the ground contact 52, as noted hereinbefore and as best illustrated within FIG. 1A. The grounding bar 58 is disposed within the channel 16 defined between the two rows of terminals 14a and 14b so as to extend substantially throughout the length of the telephone terminal block 12, and a second grounding bar 58' is similarly disposed within channel 18 defined between the two rows of terminals 14c and 14d of the telephone terminal block 12.

As can best be seen from FIG. 14, each end terminal portion 118 has a vertical offset portion 122 which is adapted to be interposed between protuberances of terminal block 12 and which is integrally connected to its respective end of the horizontal portion or member 116. At the upper end of each offset portion 122, there is integrally connected thereto a horizontally extending top wall 124 which is adapted to rest upon the tops of the noted protuberances of the terminal block 12 such that the terminal end portions 118 extend longitudinally outwardly therefrom as may be clearly appreciated from FIG. 1. With reference still being made to FIG. 14, a first angularly-disposed connecting flange 126 is integrally joined to the outer end of the top wall 124 and extends downwardly therefrom, connecting flange 126 being provided with a central aperture 128. A second angularly-disposed connecting flange 130 is disposed parallel to, but spaced apart from, the first angularly disposed connecting flange 126, and it is further seen that the second flange 130 is integrally connected to the lower end of the first flange 126 by means of a U-shaped connecting portion 132. A central aperture 134 is provided within the second connecting flange 130 so as to be aligned with the aperture 128 provided within the first flange 126, a slot 137 effectively being defined between the first and second spaced apart flanges 126 and 130 and therefore, also, between the aligned apertures 128 and 134.

A square nut 136 is disposed within the slot 137 defined between the first and second angularly-disposed connecting flanges 126 and 130, and a screw 138 is initially inserted through the aperture 134 of the second flange 130 so as to threadedly engage the nut 136. The screw 138 subsequently extends through the aperture 128 of the first flange 126, and in this manner, the square nut 136 is captivated. A common ground bus wire, not shown, may be readily connected to the head of the screw 138 mounted upon either end 118 of the grounding bar 58.

The fuse carrier 40, shown generally in FIGS. 1 and 1A, is illustrated in detail in FIGS. 15 and 16, and it is to be appreciated that as illustrated in FIGS. 1 and 1A, the fuse carrier 40 is adapted to be a plug-in type assembly which is to be mated with the upper portion or section 32 of the housing 22. More specifically, as seen in FIGS. 15 and 16, the fuse carrier 40 comprises a central body portion 140 and a pair of laterally spaced platforms 142 integrally connected to opposite ends of the central body portion 140. A handle member 144 is integrally formed upon the upper surface of the central body portion 140 so as to enable a user to grasp the carrier 40 during a handling or transportation mode, or to facilitate the insertion into or removal from the bridging portion or section 38 of the housing 22. The central body portion 140 has a cavity 146 defined therein for accommodating a pair of fuses 148, only one of which is shown in FIG. 15. Each of the fuses 148 includes a pair of oppositely extending blade contacts 150 wherein each blade contact 150 has a contact area disposed within a space or gap 152 defined beneath a respective one of the platforms 142. The contact areas of the blade contacts 150 of the fuses 148 are respectively received in a snug engagement arrangement or manner within the corresponding fuse blade contact-receiving openings 72 defined within the upper portions of the terminal/fuse contacts 56 when the fuse carrier 40 is mounted atop the housing 22 and thereby mated with the laterally spaced recessed portions or sections 34a, 34b, 36a, and 36b, as well as with the central recessed bridging portion or section 38. For a complete description of other details of the fuse carrier 40, reference can be made to the aforenoted U.S. Pat. No. 4,968,264.

The four terminal/fuse contacts 56, the ground contact 52, the voltage suppressor 50, and the rectifying device 48 are all assembled together into a sub-assembly as shown in FIG. 2, and this sub-assembly is then positioned between the two halves 24 and 26 of the housing 22. The housing halves 24 and 26 are then brought together so as to sandwich the sub-assembly therebetween, and a suitable sonic welding process may then be employed so as to fixedly secure the two housing halves together. The fuse carrier 40 may then be installed upon the upper portion 32 of the housing 22, and the two prongs 80 of the ground contact 52, extending downwardly from and externally of the lower terminal portion 28 of the housing 22, may be inserted into one of the openings or apertures 60 defined within the horizontal member 116 of the ground bar 58 which is mounted upon the telephone terminal block 12. As a result, a voltage protector and grounding bar arrangement, as generally indicated by the reference character 10 of FIG. 1, wherein the arrangement is also provided with surge-current or over-current protection capabilities, is thus formed, and the schematic circuit diagram, corresponding to such an arrangement, is illustrated in FIG. 17.

With reference now being made to FIG. 18, in those applications wherein over-current or surge-current protection is not required to be provided by suitable means incorporated within the two-piece housing 22, the plug-in fuse carrier 40 may be replaced by means of a plug-in bridging-clip carrier 40A which is substantially identical to the plug-in fuse carrier 40 illustrated within FIG. 15 except for the fact that in lieu of the fuse components 148, the plug-in bridging clip carrier 40A is similarly provided with a pair of side-by-side bridging clips 248 disposed within the central cavity 246 defined within the central body portion 240. The bridging clips 248 are provided with blade contacts 250 at opposite ends thereof for mating with the terminal contacts 56 disposed within the two-piece housing 22 in a manner substantially identical to the mating of the fuse blade contacts 150 with the terminal contacts 56 of the housing 22. FIG. 19 illustrates the circuit diagram, similar to that of FIG. 17, wherein the bridging clip carrier 40A, with its bridging clip contacts 250, is used in lieu of the fuse-carrier 40 with its fuse contacts 150. Throughout FIGS. 18 and 19, it is to be understood that corresponding parts, elements, or components of the system are designated by means of similar reference characters except, for example, the reference characters of the bridging clip carrier of FIG. 18, and its corresponding circuit diagram of FIG. 19, are denoted by numbers in the "200" series as opposed to the "100" series of FIGS. 15 and 17. Similarly, just as the bridging clip carrier of the embodiment of FIG. 18 has been designated with the additional reference character "A" so as to correspond to the fuse carrier of the embodiment of FIG. 15, the voltage suppressors and diode rectifier of FIG. 19 are similarly designated with respect to the same components of FIG. 17 except for the fact that an "A" has been added to the corresponding reference characters.

Considering now FIG. 20, in connection with those telephone applications wherein over-current or surge-current protection is desired to be incorporated within the two-piece housing 22, but not necessarily by means of fuses disposed within a plug-in fuse carrier, such protection may be provided by means of suitably known positive-temperature-coefficient (PTC) devices which may be incorporated within a plug-in carrier 40B, wherein the PTC devices, only one of which is shown, are designated as at 348. The PTC devices 348 are provided with oppositely disposed contact leads 350 for mating with the terminal contacts 56 of the housing 22, and it is seen that the remaining components or elements of the PTC plug-in carrier 40B are similar to the fuse and bridging clip carriers 40 and 40A of FIGS. 15 and 18 except that the components of the PTC carrier 40B have been designated by reference characters of the "300" series. Similarly, as can be seen from the corresponding circuit diagram of FIG. 21, the voltage suppressors and diode rectifier have been designated by reference characters similar to those employed within FIGS. 17 and 19 except that such components have been designated by a "B" series.

Continuing still further, as noted hereinbefore, in conjunction with particular telephone terminal blocks, arrangements, or applications, it is sometimes desirable to provide over-current or surge-current, or over-voltage or surge-voltage, protection with respect to both sides of a particular circuit sought to be protected in order to protect the circuit from over-current or surge-current, or over-voltage or surge-voltage, conditions which may be generated in a multiplicity of directions, such as, for example, from the telephone central office, from the customer premises, or from the customer ground line. At the same time, it is desirable to provide such protection devices upon housings which are similar in structure to the housing 22 of FIG. 1 whereby such new housings are nevertheless able to be used in conjunction with, and mounted upon, the same terminal blocks, such as, for example, the terminal block 12 of FIG. 1. With reference therefore being made to FIGS. 22 and 23, there is illustrated a new and improved voltage protector and grounding bar arrangement, generally indicated by the reference character 510, which comprises a fourth embodiment of the present invention and is seen to include a terminal block 512 which is a telephone terminal block substantially identical to the terminal block 12 of FIG. 1 and is therefore an AT&T Style 110 Block. The terminal block 512 comprises a plurality of rows of terminals 514a, 514b, 514c, and 514d, wherein the terminal rows 514a and 514b are laterally spaced with respect to each other so as to form an elongated or longitudinally extending channel 516 therebetween, and similarly, terminal rows 514c and 514d are laterally spaced with respect to each other so as to form an elongated or longitudinally extending channel 518 therebetween. As was the case with the first embodiment of the invention illustrated in FIG. 1, each one of the rows of terminals 514a–514d is provided with a plurality of longitudinally aligned terminals 520 or 520', and the terminals 520 disposed within the rows 514a and 514d are laterally aligned with corresponding terminals 520' disposed within terminal rows 514b and 514c, respectively. Therefore, each set of corresponding, laterally opposed or aligned terminals 520 and 520' define a terminal pair, and it will be seen hereinbelow that the voltage protector and grounding bar arrangement 510 of this embodiment of the present invention, as was the case with the arrangement of the first embodiment of the invention, suitably interconnects pairs of opposed terminals 520 and 520' disposed within the terminal rows 514a and 514b, and 514c and 514d.

The voltage protector and grounding bar arrangement 510 further includes a plastic housing 522 which is fabricated from a suitable plastic material, such as, for example, a fire-retardant polymer, and which is comprised of two co-mating front and back halves 524 and 526. The two housing halves 524 and 526 comprise identical parts which, as will become more apparent hereinafter, are adapted to be assembled together and sonically welded to each other. As was the case with the housing 22 of the first embodiment of the present invention, the housing 522 may be considered to comprise a lower terminal portion or section 528, a middle body portion or section 530, and laterally separated, upper plug-in carrier portions or sections 532, it being further appreciated that while the housing 22 of the first embodiment of the present invention had a substantially square configuration, the housing 522 of the embodiment of FIG. 23 has a substantially triangular configuration with the plug-in carriers mounted upon the two lateral sides of the triangular housing 522 while the terminal block mating contacts of the housing 522 are disposed along the base of the triangular housing 522.

More particularly, the lower terminal portion or section 528 is adapted to have the terminal components thereof plugged into the AT&T Style 110 Block such that the terminal components of the housing 522 are engaged with or are connected to the terminals 520 and 520' of the terminal block 512. As best seen from FIGS. 24 and 25, the upper plug-in carrier portions or sections 532 each includes first and second pairs of laterally spaced, outwardly projecting recessed portions or sections 534a and 534b respectively provided upon housing half 526, and third and fourth pairs of similarly laterally spaced, outwardly projecting recessed portions or sections 536a and 536b respectively provided upon housing half 524. The recessed portions 534a and 534b, as well as the recessed portions or sections 536a and 536b, are disposed in opposed or aligned pairs, and the sets of opposed or aligned pairs of recessed portions or sections 534a and 536a, and 534b and 536b, are laterally separated from each other by means of central, recessed bridging portions or sections 538. In accordance with the fourth embodiment of the present invention, the central recessed bridging portions or sections 538 of the housing 522 are adapted to accommodate central body portions 640 of plug-in fuse carriers 540 which are identical to the fuse carriers 40 of the first embodiment of the present invention shown in FIG. 1, the assembled fourth embodiment being shown in FIG. 23. As best seen from FIG. 25, each housing half 524 and 526 accommodates three housing terminals or contacts 556, each of which has a substantially Y-shaped configuration, and it will be appreciated that one of the arms of each housing terminal or contact 556 will be mounted or disposed within one of the recessed portions or sections 534a, 534b, 536a, and 536b of the housing halves 524 and 526 so as to accommodate blade contacts, not shown, of the fuse carriers 540 in a manner similar to that in connection with the blade contacts 150 of the fuse carrier 40 of the first embodiment of the present invention as shown in FIG. 15.

The front and back halves 524 and 526 of the housing 522 are provided with confronting and interfitting sidewall members 542, 543, and 544, respectively, and are also therefore provided with, in effect, relatively recessed rear wall members 546. In this manner, the wall members 542, 543, 544, and 546 effective define socket portions for receiving and enclosing or housing a suitable rectifying device, such as, for example, a diode bridge rectifier 548, as seen in FIG. 26, and a pair of suitable voltage suppressors, such as, for example, a sidactor or silicon avalanche suppressor 550. Still further, a ground contact 552 is also disposed within a lower portion of the housing 522, and it is seen that an upper portion of the ground contact 552 is connected to the voltage suppressors 550, while a lower portion of the ground contact 552 extends through a slot 614 defined within the lower end or sidewall 544 of each housing half 524 and 526, the ground contact 552 being seated within a chamber which is formed by chamber sections 602 defined within each housing half 524 and 526. The lower end portion of the ground contact 552 is adapted to be mated with a strip-like grounding bar 558 which is disposed within the elongated or longitudinally extending channel 516 defined between the terminal rows 514a and 514b of the terminal block 512, and ground contacts 552 of additional housings 522 are adapted to be similarly mated with another strip-like grounding bar 558' which is disposed within the elongated or longitudinally extending channel 518 defined between the terminal rows 514c and 514d of the terminal block 512. As best seen in FIGS. 23 and 27, each one of the grounding bars 558 and 558' is provided with a plurality of serially aligned openings or apertures 560 for respectively receiving therein the prong-like distal or lower end portions 580 of the corresponding ground contacts 552. It is to be lastly noted that with respect to the housing assemblies shown in FIGS. 25 and 26, the only substantial difference to be noted with respect to such assemblies is that in connection with the assembly of FIG. 26, the diode bridge rectifier 548 is employed in view of the fact that such an assembly represents a high-speed, high-frequency assembly as opposed to a standard speed assembly illustrated within FIG. 25.

Figure 25:
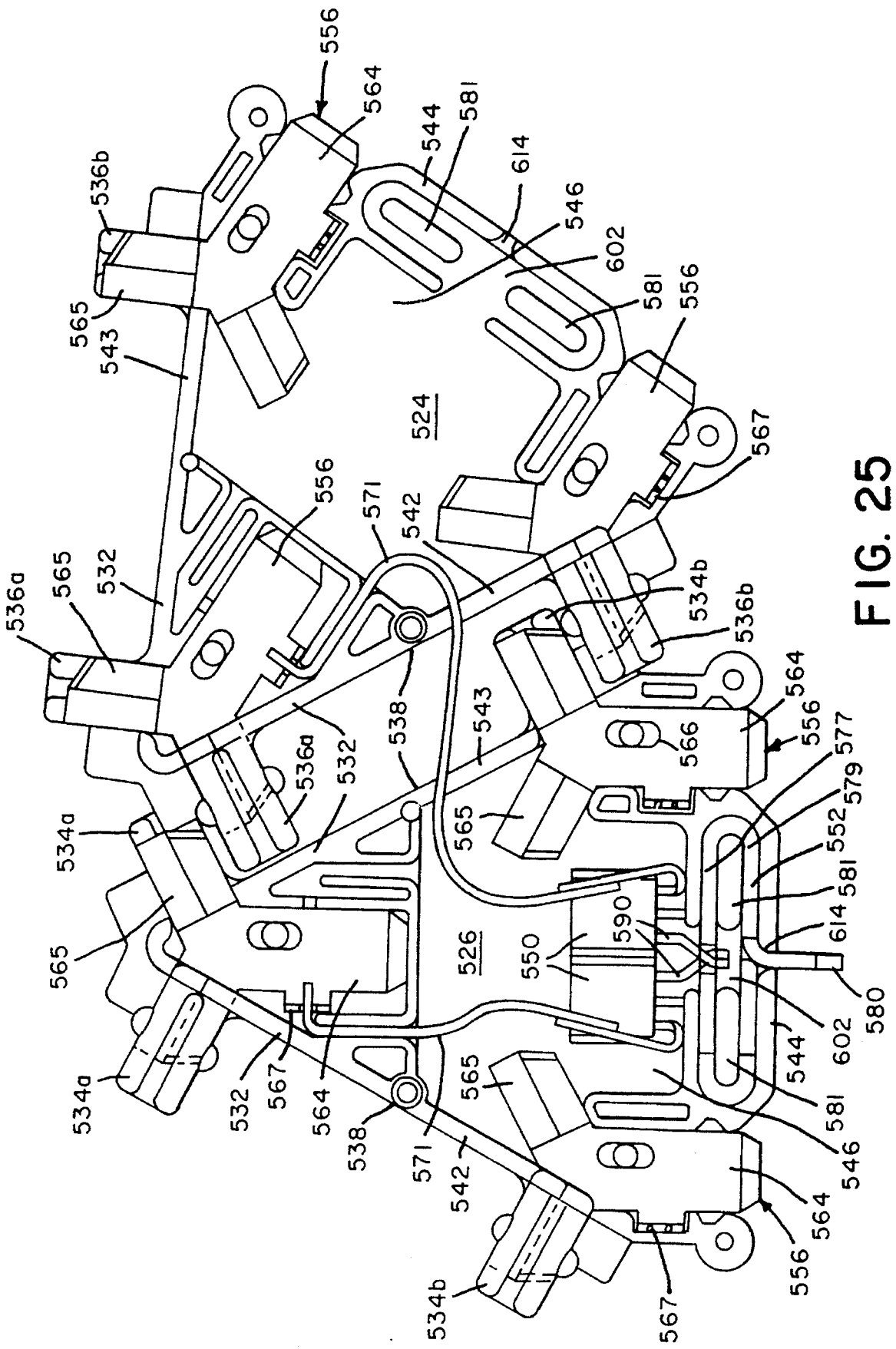
FIG. 25 is a side elevational view of both housing halves of the dual plug-in carrier housing of FIG. 23 showing the components thereof as assembled-therein for use as a dual plug-in standard speed fuse carrier assembly.
Figure 26:
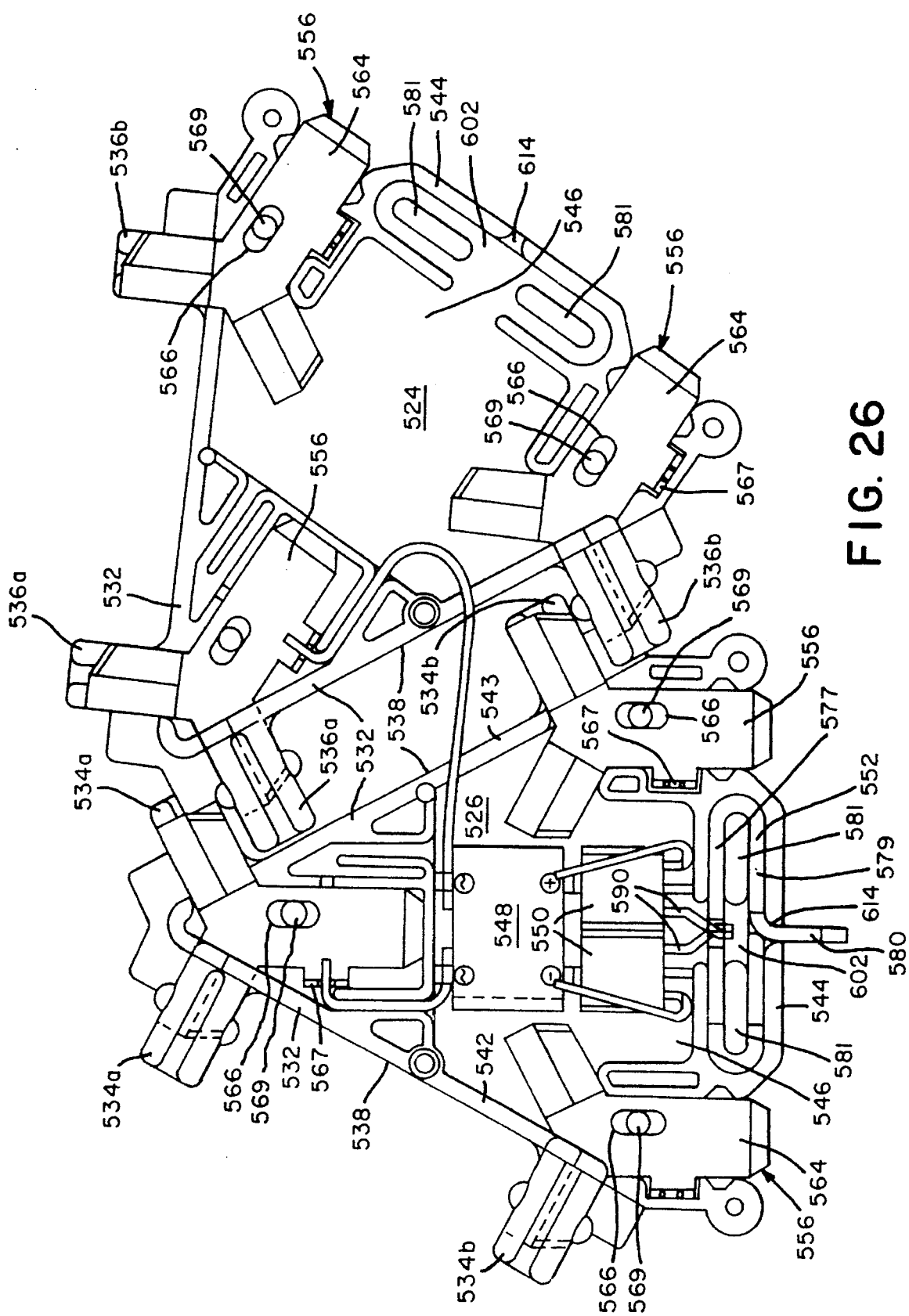
FIG. 26 is a view similar to,that of FIG. 25 showing however the components thereof assembled therein for use as a dual plug-in high speed fuse carrier assembly.

With reference now being made to FIGS. 28 and 29, the terminal contacts 556, which were previously seen in FIGS. 25 and 26, are shown in detail and are all identical with respect to each other so as to be capable of being used at any one of the three corner or apex positions within each housing half 524 and 526. In particular, each one of the contacts 556 is preferably formed from a suitable phosphor-bronze strip metal and is tin-plated for solderability and corrosion resistance. Each one of the terminal contacts 556 comprises an integral sheet metal stamping and includes a flat body portion 562 which is substantially Y-shaped in configuration so as to effectively define a downwardly extending leg portion 564 and a pair of upper, angularly divergent arm portions 565. A mounting aperture 566 is formed within the upper body portion 562 for receiving mounting studs or pegs 569 provided upon each housing half 524 and 526 such that the terminal contacts 556 are fixedly mounted within the housing halves 526 and 526. A wire insulation cutting and mounting terminal 567 is also integrally provided upon one side edge portion of the terminal contact body portion 562 so as to mount a connecting wire, such as, for example, a jumper wire 571 interconnecting one of the sidactor voltage suppressors 550 and the upper terminal contact 556 as seen in FIG. 25. At the distal end portions of each one of the terminal contact arms 565, there is integrally provided two off-set strip portions 570a and 570b which are, in effect, disposed upon opposite sides of the plane defining the body portion 562 so as to define therebetween a fuse-blade opening or cavity 572. Each one of the off-set strip portions 570a and 570b is also seen to comprise an outwardly deflected or flared distal tip portion 574 whereby such tip portions 574 together serve as a lead-in or guide for the fuse blade contact of the plug-in fuse carrier 540 when the carrier 540 is mounted upon the housing 522 as seen in FIGS. 22 and 23.

The ground contact 552 is fabricated from a suitable non-ferrous sheet metal, and in a manner similar to that of fabricating the terminal contacts 556, the ground contact 552 is stamped from a suitable phosphor-bronze strip metal and is subsequently tin-plated for solderability and corrosion resistance. The contact 552, already shown in FIGS. 25 and 26 as being part of the housing assembly, is also shown in completed detail in FIGS. 30 and 31. As can be appreciated from the latter drawing figures, ground contact 552 is seen to have a substantially T-shaped configuration comprising a substantially C-shaped head portion 576, and a pair of dependent spaced-apart prong portions 580. The head portion 576, in turn, comprises an upper head portion 577 and a lower head portion 579, and the prong portions 580 extend downwardly from the lower head portion 579. As can be appreciated from FIGS. 24–26, each housing half 524 and 526 is provided with a pair of laterally spaced, oval-shaped projections 581 extending outwardly from the rear wall members 546, and as can be best seen from FIGS. 25 and 26, the ground contact 552 is seated within the chamber sections 602 such that the oval-shaped projections 581 are interposed between the upper and lower head portions 577 and 579. The prong portions 580 extend downwardly through the slot portions 614 defined within each housing half 524 and 526, and it is further seen that the upper head portion 577 of the ground contact 552 is provided with an aperture 582 through which terminal pin leads 590 of the sidactor voltage suppressors 550 project so as to provide a soldered electrical connection between the sidactors 550 and the ground contact 552. It is lastly to be appreciated, with reference being made to FIG. 24 for best clarity, that the lower corner portions of the housing halves, as exemplified by means of housing half 526, are provided with downwardly extending or oriented open cavities 604 through which the downwardly extending leg portions 564 of the terminal contacts 556 extend so as to be capable of engaging the terminals 520 and 520' of the terminal block 512 when the housing 522 is mounted upon the terminal block 512.

With reference now being made to FIGS. 27, 32, and 33, each grounding bar 558 or 558', with grounding bar 558 actually being illustrated within the noted drawing figures, is fabricated from a suitable non-ferrous metal strip, such as, for example, copper that is subsequently tin-plated for good electrical contact and corrosion resistance, and is formed so as to have the configuration or structure shown in the noted drawing figures as well as partially shown in FIGS. 22 and 23. More particularly, the grounding bar 558 comprises a central, elongated flat horizontal member or portion 616, and a pair of end terminal portions 618 integrally connected to opposite ends of the horizontal portion or member 616. The horizontal portion or member 616 is provided with the plurality of serially aligned apertures 560 for receiving therein the two prongs 580 of the ground contact 552 as noted hereinbefore and as best illustrated in FIG. 23. The grounding bar 558 is disposed within the channel 516 defined between the two rows of terminals 514a and 514b so as to extend substantially throughout the length of the telephone terminal block 512, and the second grounding bar 558' is similarly disposed within channel 518 defined between the two rows of terminals 514c and 514d of the telephone terminal block 512. It is to be noted at this juncture that the only substantial difference between the grounding bars 58 and 58', and the grounding bars 558 and 558', resides in the fact that the plurality of serially aligned apertures 560 of the grounding bars 558 and 558' are located along the central longitudinal axis of the grounding bars 558 and 558' whereas the apertures 60 of the grounding bars 58 and 58' are offset toward one side edge of the grounding bar 58 or 58' as is clearly seen from a comparison of the bars as illustrated within FIGS. 13 and 27. In view of such, a detailed description of the terminal end portion 618 of the grounding bar 558 will be omitted, it being simply noted that such terminal end portion 618 is identical to the terminal end portion 118 of the grounding bar 58, the terminal end portion 618 of the grounding bar 558 being shown in detail in FIG. 33 with the particular component portions thereof denoted by similar reference characters in the "500" and "600" series. In addition, it is further noted that as a result of the particularly noted location of the apertures 560 along the longitudinal axis or centerline of the grounding bars 558 and 558', it is impossible to place the grounding bars 558 and 558' in an improper orientation upon the terminal block 512, or in other words, the particular disposition or orientation of the grounding bars 558 and 558', with respect to the terminal block 512, is reversible or non-polarized.

Figure 34:
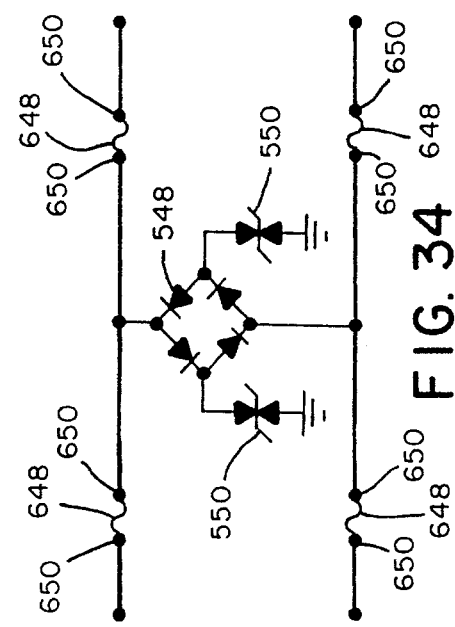
FIG. 34 is a schematic circuit diagram showing the protected circuit having the dual plug-in fuse carriers of FIG. 23 incorporated therein.

As a result of the foregoing structure, a voltage protector and grounding bar arrangement, as generally indicated by the reference character 510 in FIG. 22, wherein the arrangement is provided with surge-current or over-current protection capabilities in the form of plug-in fuse carriers, is thus formed, and a schematic circuit diagram, corresponding to such an arrangement which also includes the incorporation therein of a diode bridge rectifier, is illustrated in FIG. 34.

Figure 36:
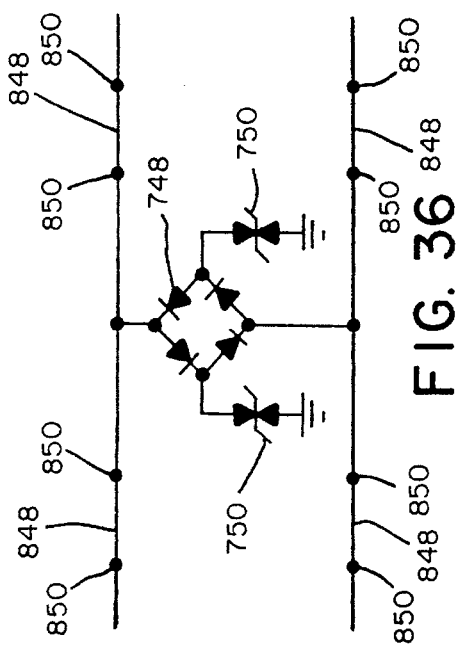
FIG. 36 is a schematic circuit diagram showing the protected circuit having the dual plug-in briding clip carriers of FIG. 35 incorporated therein.
Figure 35:
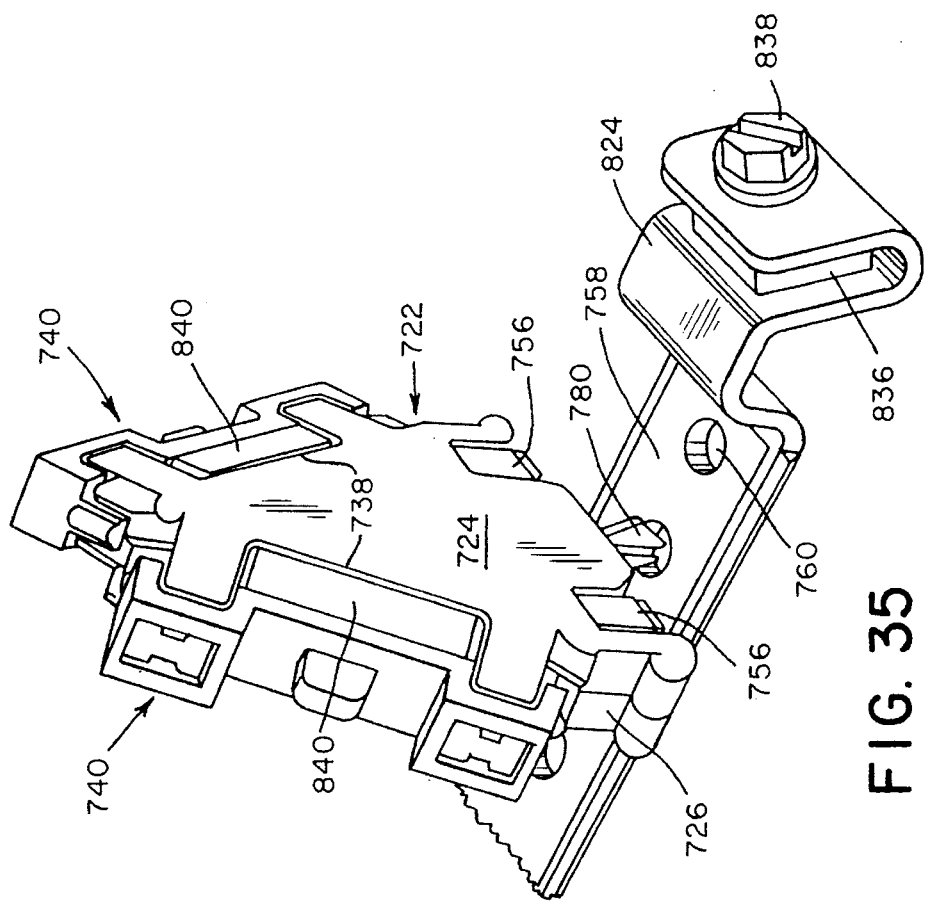
FIG. 35 is a view similar to that of FIG. 23 showing however the housing having dual plug-in bridging clip carriers mounted thereon.
Figure 37:
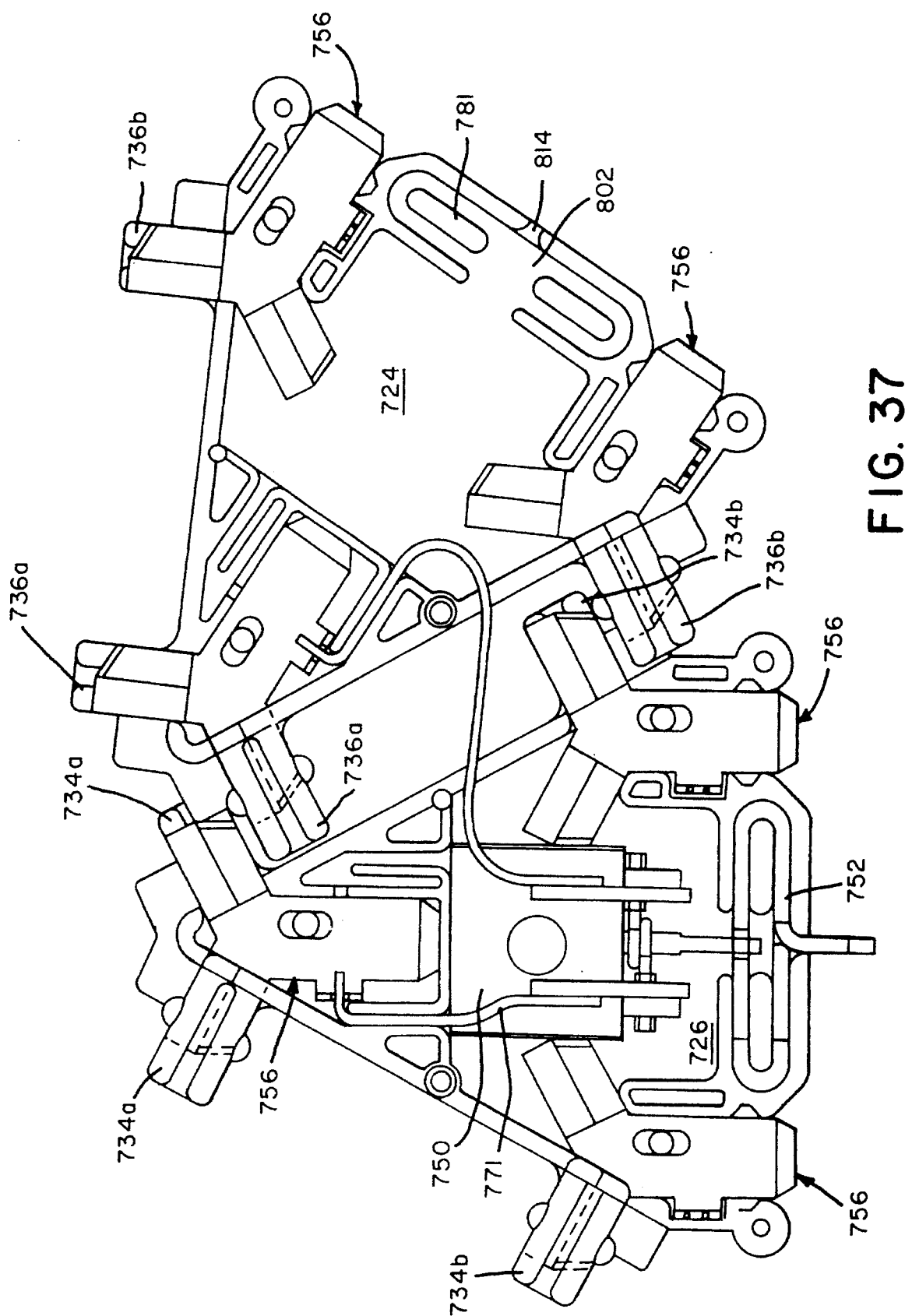
FIG. 37 is a view similar to those of FIGS. 25 and 26 showing however the assembled housing halves for use as a dual plug-in bridging clip carrier assembly.

Turning now to FIG. 35, in those applications wherein over-current or surge-current protection is not required to be provided by suitable means incorporated within or upon the two-piece housing 522, the plug-in fuse carrier 540 thereof may be replaced by means of a plug-in bridging clip carrier 740 which is substantially identical to the plug-in fuse carrier 540 illustrated within FIG. 23 except for the fact that in lieu of the fuse components 648 as illustrated in FIG. 34, the plug-in bridging clip carrier 740 is similarly provided with a pair of side-by-side bridging clips 848 which are illustrated within FIG. 36. The bridging clips 848 are provided with blade contacts 850 at opposite ends thereof for mating with the terminal contacts 756 disposed within the two-piece housing 722 in a manner substantially identical to the mating of the fuse blade contacts 650 with the terminal contacts 556 of the housing 522. The various components of the voltage protector and grounding bar arrangement corresponding to that of FIG. 35 but disposed internally of the two-piece housing 722 are illustrated within FIG. 37, it being understood that while a detailed description of the various components has been omitted in view of the similarity of the structure to that of, for example, FIGS. 23 and 25, corresponding parts of the arrangement of FIGS. 35 and 37 have been designated with similar reference characters except that they are in the "700" and "800" series. The only other significant difference between the arrangement of FIG. 37, as compared to that of FIG. 25, is that in the bridging arrangement of FIG. 37, only a single sidactor voltage suppressor 750 is utilized.

Figure 39:
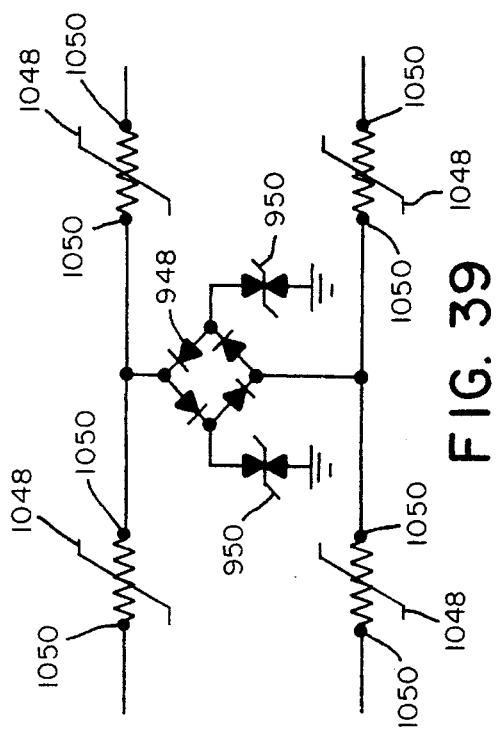
FIG. 39 is a schematic circuit diagram showing the protected circuit having the dual plug-in PTC carriers of FIG. 38 incorporated therein.
Figure 38:
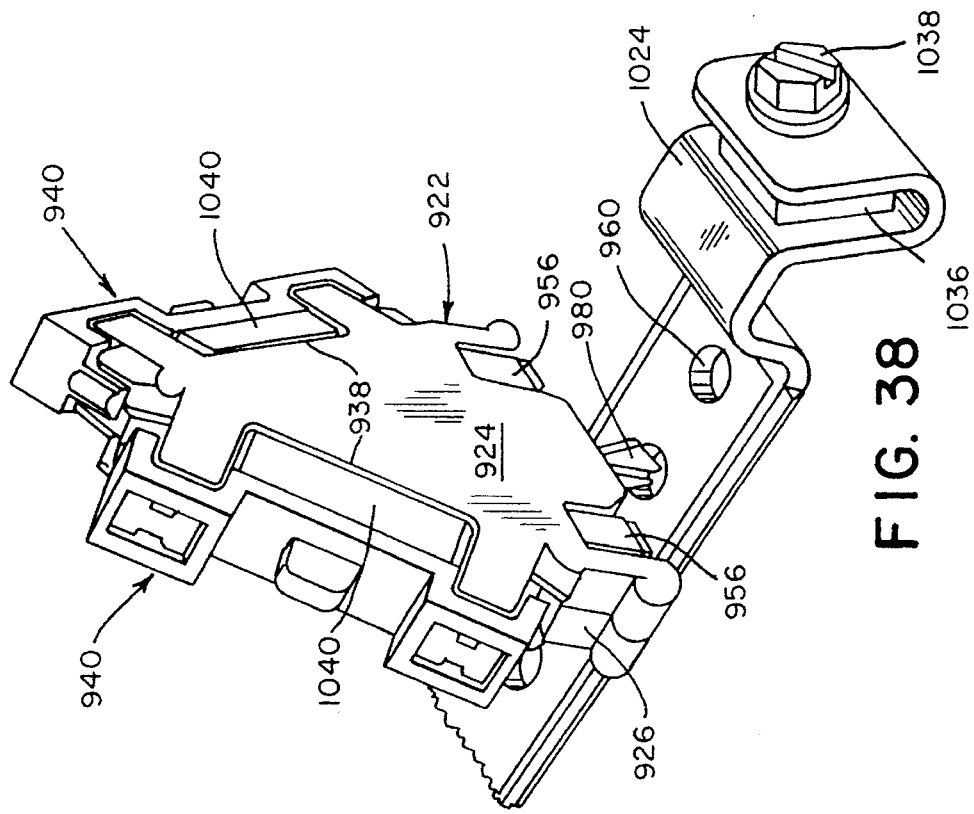
FIG. 38 is a view similar to that of FIG. 23 showing however the housing having dual plug-in PTC carriers mounted thereon.

With reference lastly being made to FIG. 38, in connection with those telephone applications wherein wherein over-current or surge-current protection is desired to be incorporated within housings similar to those designated by the reference character 522 as illustrated in FIG. 23, but not necessarily by means of fuses disposed within plug-in fuse carriers 540, such protection may be provided by means of suitably known positive-temperature-coefficient (PTC) devices which may be incorporated within similar plug-in carriers as designated at 940 within FIG. 38, wherein the PTC devices are schematically illustrated at 1048 in FIG. 39. The PTC devices are provided with oppositely disposed contact blades 1050, also schematically illustrated in FIG. 39, for mating with the terminal contacts 956 of the housing 922, and it is to be noted that all of the components of the arrangement of FIGS. 38 and 39 are similar to those of previous embodiments except that the components of FIGS. 38 and 39 have been designated by reference characters in the "900" and "1000" series.

From the foregoing detailed description, it can thus be seen that the present invention provides a voltage pretector and grounding bar arrangement for use with a telephone terminal block having at least two rows of terminals which are spaced apart from each other so as to form an elongated channel therebetween, wherein the voltage protector and grounding bar arrangement of the present invention can take the form of several different, but similar, embodiments. Each embodiment or arrangement includes a two-piece interfitting housing for receiving or containing an over-voltage or surge-voltage protection device therein, a ground contact, a grounding bar adapted to be mounted upon the terminal block and to be connected to the ground contact, the grounding bar being disposed within the channel of the terminal block, and at least one, and sometimes two, plug-in carrier devices for mating with terminal contacts mounted within the housing and adapted to be connected to aligned terminals of the terminal block. In both the single and double carrier device arrangements, the plug-in carriers may house fuses, PTC current-limiting devices, or bridging clips whereby, in the latter case, the two-piece housings per se only provide over-voltage or surge-voltage protection and not over-current or surge-current protection.

In light of the foregoing teachings, many variations and modifications are possible in connection with the present invention despite the illustration and description of particular embodiments thereof. It is therefore to be understood that within the scope of the appended claims, the present invention may be practiced otherwise than as specifically described hereinabove.

What is claimed as new and desired to be protected by means of Letters Patent of the United States of America is:

1. In combination, a voltage protector and grounding bar arrangement, and a telephone terminal block, comprising:

a telephone terminal block having at least two rows of terminals which are laterally spaced apart with respect to each other so as to form a longitudinally extending channel therebetween;

a grounding bar disposed within said longitudinally extending channel defined between said at least two rows of terminals of said terminal block and having a plurality of holes defined therein;

a housing;

voltage suppressor means disposed within said housing;

a plurality of terminal contacts disposed within laterally spaced portions of said housing for mating with opposed terminals of said at least two rows of laterally spaced terminals of said terminal block, disposed upon opposite sides of said longitudinally extending channel, when said housing is mounted upon said terminal block;

ground contact means disposed within said housing and between said laterally spaced terminal contacts for connection to said voltage suppressor means and to one of said plurality of holes defined within said grounding bar disposed within said longitudinally extending channel of said terminal block defined between said laterally spaced rows of terminals; and plug-in carrier means, having contacts carried therein, removably disposed upon said housing for connection to said plurality of terminal contacts of said housing.

2. The combination as set forth in claim 1, wherein:

said plug-in carrier means comprises a plug-in fuse carrier having a plurality of fuses disposed therein wherein said plurality of fuses have fuse blade contacts for engaging said plurality of terminal contacts of said housing whereby said voltage protector and grounding bar arrangement provides over-voltage and over-current protection for said terminal block.

3. The combination as set forth in claim 1, wherein:

said plug-in carrier means comprises a plug-in bridging clip carrier having a plurality of bridging clips disposed therein wherein said plurality of bridging clips have blade contacts for engaging said plurality of terminal contacts of said housing whereby said voltage protector and grounding bar arrangement provides over-voltage protection for said terminal block.

4. The combination as set forth in claim 1, wherein:

said plug-in carrier means comprises a plug-in current limiting carrier having a plurality of positive-temperature-coefficient (PTC) devices disposed therein wherein said plurality of PTC devices have lead contacts for engaging said plurality of terminal contacts of said housing whereby said voltage protector and grounding bar arrangement provides over-voltage and over-current protection for said terminal block.

5. The combination as set forth in claim 1, wherein:

said housing comprises a pair of co-mating front and back halves.

6. The combination as set forth in claim 1, further comprising:

rectifying means disposed within said housing.

7. The combination as set forth in claim 6, wherein:

said rectifying means comprises a diode bridge rectifier.

8. The combination as set forth in claim 1, wherein:

said voltage suppressor means comprises silicon avalanche suppressors.

9. The combination as set forth in claim 1, wherein:

said voltage suppressor means comprises sidactors.

10. The combination as set forth in claim 1, wherein:

said housing has a substantially square-shaped configuration; and said plug-in carrier means is disposed atop said housing.

11. The combination as set forth in claim 1, wherein:

said plurality of holes defined within said grounding bar are serially aligned within said grounding bar and laterally offset with respect to a longitudinal centerline of said grounding bar in a polarized manner.

12. In combination, a voltage protector and grounding bar arrangement, and a telephone terminal block, comprising:

a telephone terminal block having at least two rows of terminals which are laterally spaced apart with respect to each other so as form a longitudinally extending channel therebetween;

a grounding bar disposed within said longitudinally extending channel defined between said at least two rows of terminals of said terminal block and having a plurality of holes defined therein;

a housing;

voltage suppressor means disposed within said housing;

a plurality of terminal contacts disposed within laterally spaced portions of said housing for mating with opposed terminals of said at least two rows of laterally spaced terminals of said terminal block, disposed upon opposite sides of said longitudinally extending channel, when said housing is mounted upon said terminal block;

ground contact means disposed within said housing and between said laterally spaced terminal contacts for connection to said voltage suppressor means and to one of said plurality of hole defined within said grounding bar disposed within said longitudinally extending channel of said terminal block defined between said laterally spaced rows of terminals; and at least one plug-in carrier means, having contacts disposed therein, removably disposed upon said housing for connection to said plurality of terminal contacts of said housing.

13. The combination as set forth in claim 12, wherein:

said at least one plug-in carrier means comprises at least one plug-in fuse carrier having a plurality of fuses disposed therein wherein said plurality of fuses have fuse blade contacts for engaging said plurality of terminal contacts of said housing whereby said voltage protector and grounding bar arrangement provides over-voltage and over-current protection for said terminal block.

14. The combination as set forth in claim 12, wherein:

said at least one plug-in carrier means comprises at least one plug-in bridging clip carrier having a plurality of bridging clips disposed therein wherein said plurality of bridging clips have blade contacts for engaging said plurality of terminal contacts of said housing whereby said voltage protector and grounding bar arrangement provides over-voltage protection for said terminal block.

15. The combination as set forth in claim 12, wherein:

said at least one plug-in carrier means comprises at least one plug-in current limiting carrier having a plurality of positive-temperature-coefficient (PTC) devices disposed therein wherein said plurality of PTC devices have lead contacts for engaging said plurality of terminal contacts of said housing whereby said voltage protector and grounding bar arrangement provides over-voltage and over-current protection for said terminal block.

16. The combination as set forth in claim 12, wherein:

said housing has a substantially triangular configuration; and said at least one plug-in carrier means comprises a pair of plug-in carrier means disposed upon two sides of said substantially triangular housing.

17. The combination as set forth in claim 16, wherein:

said plurality of holes defined within said grounding bar are serially aligned within said grounding bar in a non-polarized manner along a longitudinal centerline location of said grounding bar.

18. The combination as set forth in claim 16, wherein:

said housing comprises a pair of co-mating front and back halves; and said plurality of terminal contacts disposed within said housing comprises three terminal contacts disposed within each one of said housing halves and located at corner apex locations of said substantially triangular housing.

19. The combination as set forth in claim 18, wherein:

each one of said plurality of terminal contacts disposed within said housing halves has a substantially Y-shaped configuration.

20. The combination as set forth in claim 19, wherein:

said ground contact means comprises a ground contact disposed within a base portion of said substantially triangular housing, and said ground contact has a substantially T-shaped configuration.

21. In combination, a voltage protector and grounding bar arrangement, and a telephone terminal block, comprising:

a telephone terminal block having at least two rows of terminals which are laterally spaced apart with respect to each other so as to form a longitudinally extending channel therebetween;

a grounding bar disposed within said longitudinally extending channel defined between said at least two rows of terminals of said terminal block and having a plurality of holes defined therein;

a housing;

voltage suppressor means disposed within said housing;

a plurality of terminal contacts disposed within laterally spaced portions of said housing for mating with opposed terminals of said at least two rows of laterally spaced terminals of said terminal block, disposed upon opposite sides of said longitudinally extending channel, when said housing is mounted upon said terminal block;

ground contact means disposed within said housing and between said laterally spaced terminal contacts for connection to said voltage suppressor means and to one of said plurality of holes defined within said grounding bar disposed within said longitudinally extending channel of said terminal block defined between said laterally spaced rows of terminals; and a pair of plug-in carrier means, having contacts disposed therein, removably disposed upon said housing for connection to said plurality of terminal contacts of said housing.

22. The combination as set forth in claim 21, wherein:

said pair of plug-in carrier means comprises a pair of plug-in fuse carriers having a plurality of fuses disposed therein wherein said plurality of fuses have fuse blade contacts for engaging said plurality of terminal contacts of said housing whereby said voltage protector and grounding bar arrangement provides over-voltage and over-current protection for said terminal block.

23. The combination as set forth in claim 21, wherein:

said pair of plug-in carrier means comprises a pair of plug-in bridging clip carriers having a plurality of bridging clips disposed therein wherein said plurality of bridging clips have blade contacts for engaging said plurality of terminal contacts of said housing whereby said voltage protector and grounding bar arrangement provides over-voltage protection for said terminal bloc 24. The combination as set forth in claim 21, wherein:

said pair of plug-in carrier means comprises a pair of plug-in current limiting carriers having a plurality of positive-temperature-coefficient (PTC) devices disposed therein wherein said plurality of PTC devices have lead contacts for engaging said plurality of terminal contacts of said housing whereby said voltage protector and grounding bar arrangement provides over-voltage and over-current protection for said terminal block.

25. The combination as set forth in claim 21, wherein:

said housing has a substantially triangular configuration; and said pair of plug-in carrier means are disposed upon two sides of said substantially triangular housing.

26. The combination as set forth in claim 25, wherein:

said plurality of holes defined within said grounding bar are serially aligned within said grounding bar in a non-polarized manner along a longitudinal centerline location of said grounding bar.

27. The combination as set forth in claim 25, wherein:

said housing comprises a pair of co-mating front and back halves; and said plurality of terminal contacts disposed within said housing comprises three terminal contacts disposed within each one of said housing halves and located at corner apex locations of said substantially triangular housing.

28. The combination as set forth in claim 27, wherein:

each one of said plurality of terminal contacts disposed within said housing halves has a substantially Y-shaped configuration.

29. The combination as set forth in claim 28, wherein:

said ground contact means comprises a ground contact disposed within a base portion of said substantially triangular housing, and said ground contact has a substantially T-shaped configuration.

30. The combination as set forth in claim 21, further comprising:

diode bridge rectifying means disposed within said housing.

* * * * *